US012630025B2

(12) United States Patent　　(10) Patent No.:　US 12,630,025 B2
Lehn et al.　　　　　　　　　　　(45) Date of Patent:　May 19, 2026

(54) SYSTEMS AND METHODS FOR POWER SHARING CONTROL FOR DIRECT INTEGRATION OF FUEL CELLS IN A DUAL-INVERTER EV DRIVETRAIN

(71) Applicants: THE GOVERNING COUNCIL OF THE UNIVERSITY OF TORONTO, Toronto (CA); ELEAPPOWER LTD., North York (CA)

(72) Inventors: Peter Waldemar Lehn, Toronto (CA); Mehanathan Pathmanathan, Toronto (CA); Sepehr Semsar, Thornhill (CA); Caniggia Castro Diniz Viana, Toronto (CA)

(73) Assignees: ELEAPPOWER LTD., Toronto (CA); THE GOVERNING COUNCIL OF THE UNIVERSITY OF TORONTO, Toronto (CA)

( * ) Notice: Subject to any disclaimer, the term of this patent is extended or adjusted under 35 U.S.C. 154(b) by 518 days.

(21) Appl. No.: 18/258,136

(22) PCT Filed: Dec. 16, 2021

(86) PCT No.: PCT/CA2021/051820
§ 371 (c)(1),
(2) Date: Jun. 16, 2023

(87) PCT Pub. No.: WO2022/126273
PCT Pub. Date: Jun. 23, 2022

(65) Prior Publication Data
US 2024/0010076 A1　　Jan. 11, 2024

Related U.S. Application Data

(60) Provisional application No. 63/126,412, filed on Dec. 16, 2020.

(51) Int. Cl.
B60L 15/00　　　(2006.01)
B60L 15/02　　　(2006.01)
(Continued)

(52) U.S. Cl.
CPC ........... B60L 15/007 (2013.01); B60L 15/025 (2013.01); B60L 15/2045 (2013.01); B60L 50/75 (2019.02);
(Continued)

(58) Field of Classification Search
CPC .. B60L 15/007; B60L 15/025; B60L 15/2045; B60L 2240/14; B60L 2240/16;
(Continued)

(56) References Cited

U.S. PATENT DOCUMENTS

2006/0164027 A1　7/2006　Welchko et al.
2006/0164028 A1　7/2006　Welchko et al.
(Continued)

OTHER PUBLICATIONS

Estima, Jorge O. et al., Efficiency Analysis of Drive Train Topologies Applied to Electric/Hybrid Vehicles, IEEE Transactions on Vehicular Technology, vol. 61, No. 3, Mar. 2012.
(Continued)

*Primary Examiner* — Lingwen R Zeng
(74) *Attorney, Agent, or Firm* — Norton Rose Fulbright Canada LLP

(57) ABSTRACT

A dual inverter drivetrain having an energy storing fuel cell integrated into an electric vehicle is disclosed. A method of operating the dual inverter drivetrain using a power sharing control approach is described, which allows the key requirements of a fuel cell to be achieved without compromising the dynamic performance of the electric vehicle drive system. In particular, the ability of this control approach to ensure unidirectional power transfer from the fuel cell even in the event of regenerative braking, and a slowly changing fuel cell power despite fast motor torque transients were exhibited.

20 Claims, 31 Drawing Sheets

(51) Int. Cl.

| | |
|---|---|
| *B60L 15/20* | (2006.01) |
| *B60L 50/75* | (2019.01) |
| *B60L 58/30* | (2019.01) |
| *B60L 58/40* | (2019.01) |
| *B60L 7/18* | (2006.01) |
| *B60L 50/51* | (2019.01) |
| *H01M 8/04298* | (2016.01) |
| *H01M 10/42* | (2006.01) |
| *H01M 10/44* | (2006.01) |
| *H01M 16/00* | (2006.01) |
| *H02M 1/10* | (2006.01) |
| *H02M 3/158* | (2006.01) |
| *H02M 7/5387* | (2007.01) |
| *H02P 21/00* | (2016.01) |
| *H02P 23/26* | (2016.01) |
| *H02P 27/08* | (2006.01) |

(52) U.S. Cl.
CPC ............... *B60L 58/30* (2019.02); *B60L 58/40* (2019.02); *B60L 7/18* (2013.01); *B60L 50/51* (2019.02); *B60L 2240/14* (2013.01); *B60L 2240/16* (2013.01); *B60L 2240/421* (2013.01); *B60L 2240/423* (2013.01); *B60L 2240/429* (2013.01); *B60L 2240/547* (2013.01); *H01M 8/04298* (2013.01); *H01M 10/425* (2013.01); *H01M 2010/4271* (2013.01); *H01M 10/44* (2013.01); *H01M 16/006* (2013.01); *H01M 2220/20* (2013.01); *H01M 2250/20* (2013.01); *H02M 1/10* (2013.01); *H02M 3/1582* (2013.01); *H02M 3/1584* (2013.01); *H02M 7/5387* (2013.01); *H02P 21/0089* (2013.01); *H02P 23/26* (2016.02); *H02P 27/085* (2013.01); *Y02T 10/70* (2013.01)

(58) Field of Classification Search
CPC ......... B60L 2240/421; B60L 2240/423; B60L 2240/429; B60L 2240/547; B60L 50/51; B60L 50/75; B60L 58/30; B60L 58/40; B60L 7/14; B60L 7/18; H02M 1/10; H02M 3/1582; H02M 3/1584; H02M 7/5387; H01M 10/425; H01M 10/44; H01M 16/006; H01M 2010/4271; H01M 2220/20; H01M 2250/20; H01M 8/04298; H02P 21/0089; H02P 23/26; H02P 27/085; Y02T 10/70; Y02T 90/40
See application file for complete search history.

(56) References Cited

U.S. PATENT DOCUMENTS

| | | |
|---|---|---|
| 2006/0238033 A1 | 10/2006 | Raiser et al. |
| 2009/0032319 A1 | 2/2009 | Nagashima et al. |
| 2019/0296663 A1* | 9/2019 | Oka ..................... H02P 21/0003 |
| 2019/0296670 A1 | 9/2019 | Omata et al. |

OTHER PUBLICATIONS

Williamson, Sheldon S. et al., Industrial Electronics for Electric Transportation: Current State-of-the-Art and Future Challenges, IEEE Transactions on Industrial Electronics, vol. 62, No. 5, May 2015.

Corzine, K.A. et al., Performance Characteristics of a Cascaded Two-Level Converter, IEEE Transactions on Energy Conversion, vol. 14, No. 3, Sep. 1999.

Kim, Junha et al., Dual-Inverter Control Strategy for High-Speed Operation of EV Induction Motors, IEEE Transactions on Industrial Electronics, vol. 51, No. 2, Apr. 2004.

Welchko, Brian A. et al., Short-Circuit Fault Mitigation Methods for Interior PM Synchronous Machine Drives using Six-Leg Inverters, 35th Annual IEEE Power Electronics Specialists Conference, Aachen, Germany, 2004.

Kalaiselvi, J. et al., Bearing Currents and Shaft Voltage Reduction in Dual-Inverter-Fed Open-End Winding Induction Motor With Reduced CMV PWM Methods, IEEE Transactions on Industrial Electronics, vol. 62, No. 1, Jan. 2015.

Jia, Yi-Fan et al., Power Flow Control Strategy Based on the Voltage Vector Distribution for a Dual Power Electric Vehicle With an Open-End Winding Motor Drive System, IEEE Access, 10.1109/ACCESS.2018.2872697, Oct. 19, 2018.

Lee, Yongjae et al., Hybrid Modulation of Dual Inverter for Open-End Permanent Magnet Synchronous Motor, IEEE Transactions on Power Electronics, vol. 30, No. 6, Jun. 2015.

Lu, Shuai et al., A Unique Ultracapacitor Direct Integration Scheme in Multilevel Motor Drives for Large Vehicle Propulsion, IEEE Transactions on Vehicular Technology, vol. 56, No. 4, Jul. 2007.

Shi, Ruoyun et al., Coordinated Power Sharing for Enhanced Utilization of Mixed Energy Storage Media in Dual-Inverter Electric Vehicles, IEEE Xplore, Feb. 12, 2024.

Lai, Jih-Sheng (Jason) et al., Energy Management Power Converters in Hybrid Electric and Fuel Cell Vehicles, IEEE Xplore, Feb. 12, 2024.

Prasanna, Udupi R. et al., Propulsion System Architecture and Power Conditioning Topologies for Fuel Cell Vehicles, IEEE Transactions on Industry Applications, vol. 51, No. 1, Jan./Feb. 2015.

Bauman, Jennifer, A Comparative Study of Fuel-Cell-Battery, Fuel-Cell-Ultracapacitor, and Fuel-Cell—Battery—Ultracapacitor Vehicles, IEEE Transactions on Vehicular Technology, vol. 57, No. 2, Mar. 2008.

Raga, C. et al., Driving profile and fuel cell minimum power analysis impact over the size and cost of fuel cell based propulsion systems, IEEE Xplore, Feb. 12, 2024.

Thounthong, Phatiphat et al., Comparative Study of Fuel-Cell Vehicle Hybridization with Battery or Supercapacitor Storage Device, IEEE Transactions on Vehicular Technology, vol. 58, No. 8, Oct. 2009.

Attaianese, Ciro et al., Power Control for Fuel-Cell-Supercapacitor Traction Drive, IEEE Transactions on Vehicular Technology, vol. 61, No. 5, Jun. 2012.

Pasricha, Sandip et al., Comparison and Identification of Static Electrical Terminal Fuel Cell Models, IEEE Transactions on Energy Conversion, vol. 22, No. 3, Sep. 2007.

Boscaino, V. et al., Fuel cell Modelling and Test: experimental validation of model accuracy, 4th International Conference on Power Engineering, Energy and Electrical Drives, Istanbul, Turkey, May 13-17, 2013.

Anonymous, Fuel Cell Power Module for Heavy Duty Motive Applications, Ballard Product Data Sheet, undated.

Morimoto, Shigeo et al., Wide-Speed Operation of Interior Permanent Magnet Synchronous Motors with High-Performance Current Regulator, IEEE Transactions on Industry Applications, vol. 30, No. 4, Jul. /Aug. 1994.

Fajri, Poria et al., Equivalent Vehicle Rotational Inertia Used for Electric Vehicle Test Bench Dynamic Studies, IEEE Xplore, Feb. 12, 2024.

European Patent Office, Supplementary European Search Report for Application No. EP 21 90 4733, dated Oct. 29, 2024.

Laldin et al., Predictive Algorithm for Optimizing Power Flow in Hybrid Ultracapacitor/Battery Storage Systems for Light Electric Vehicles, IEEE Transactions on Power Electronics, vol. 28, No. 8, dated Aug. 2013.

Canadian Intellectual Property Office (CIPO), International Search Report & Written Opinion to PCT/CA2021/051820, Mar. 15, 2022.

* cited by examiner

400

1000C

1600A

1700

SYSTEMS AND METHODS FOR POWER SHARING CONTROL FOR DIRECT INTEGRATION OF FUEL CELLS IN A DUAL-INVERTER EV DRIVETRAIN

CROSS REFERENCE

This application is a non-provisional of, and claims all benefit, including priority to, U.S. Application No. 63/126, 412, filed Dec. 16, 2020, entitled "SYSTEMS AND METH-ODS FOR POWER SHARING CONTROL FOR DIRECT INTEGRATION OF FUEL CELLS IN A DUAL-IN-VERTER EV DRIVETRAIN", incorporated herein by reference in its entirety.

FIELD

Embodiments of the present disclosure generally relate to the field of electronic vehicles, and more specifically, embodiments relate to devices, systems, and methods for improved direct integration of fuel cells in an electric vehicle.

INTRODUCTION

Adoption of electric vehicles (EVs) is an important step in reducing the transportation sector's carbon emissions. Existing EV drivetrains typically consist of a direct current (DC) energy source, a three-phase two-level inverter, and a three-phase traction motor. The DC energy source is usually a lithium ion battery (LiB), which are batteries that have high energy and power density.

EVs powered by fuel cell batteries (FCs) are an alternative to existing LiB powered EVs. Existing solutions to integrate FCs into an EV drivetrain include a DC-DC converter to connect the low voltage DC output of the FC to the high voltage output of the LiB.

SUMMARY

A DC-DC converter is often utilized in EVs to integrate a fuel cell stack (FC) because it is technologically very challenging to directly integrate the FC (e.g., direct integration being a method where the FC is integrated into a vehicle's drivetrain without a specific power electronic converter, whose sole purpose is just to integrate the FC), as the FC, among other reasons, has challenging electrical characteristics (e.g., slowly changing power reference, long start-up time) that are incongruent with electrical requirements that arise during normal operation of the EV (e.g., fast torque response when accelerating/decelerating, fast absorption of power requested from the EV traction motor during regenerative braking). As discussed within this disclosure, an improved approach is proposed that does not require a dedicated DC-DC converter.

For example, FCs cannot absorb power, have a lower output voltage compared to LiBs, have an output voltage that declines as the loading of the FC increases, require that the power produced by the FC be kept above a minimum value to prevent undesirable shut downs, and require the rate of change of FC power being produced to be limited, to reduce the risk of damage to the FC. An EV drivetrain including an FC that mitigates or overcomes some limitations of the FC is desirable.

The dedicated DC-DC converter of alternate approaches adds undesirable weight, complexity, and volume to the drivetrain of the EV. As the locomotion of vehicles requires energy to move the vehicle, increased weight causes the vehicle to become less power efficient. Increased complexity is undesirable as it increases the cost of manufacture (especially a magnetic storage stage, such as an inductor) and maintenance, and decreases the reliability of the vehicle. Volume is a premium on vehicles, as vehicles have many other components that also take up physical space and any usage of physical space for the DC-DC converter removes the carrying capacity of the EV in terms of cargo load or passenger space. The requirement for a dedicated DC-DC converter reduces adoption of FC powered EVs. As FC powered EVs generally produce reduced emissions (or no emissions) relative to vehicles with internal combustion engines, it is desirable to encourage adoption to aid in the reduction of environmental impacts associated with the operation of vehicles (e.g., passenger transport, freight transport) as well as a potential conservation of the natural environment and resources (e.g., fossil fuels).

Accordingly, the technical approach described herein proposes a circuit topology and corresponding control methods and instruction sets (e.g., computer program products or machine program products) that allow for the elimination of the DC-DC converter, and permit direct usage of the FC as one of the energy sources in a dual inverter drive. The other source, for example, can be an EV battery pack (or an EV supercapacitor). The approach utilizes control mechanisms that control certain electrical characteristics of power flowing from the FC. While battery embodiments are described for illustrative purposes, it is important to note that not all embodiments are thus limited and the batteries may be replaced by other types of energy sources, such as supercapacitors.

As described in various embodiments, a control approach for power factor control is implemented such that the slowly changing power reference of the fuel cell can be adhered to while providing the fast torque response needed by the EV in certain situations that can arise during operation of the EV. The approach is directed to, among others, avoid dangerous operation conditions to improve safety when operating the EV.

The control approach for power factor control is technically challenging to implement in that both the physical limitations of the battery energy source and the FC energy source need to be accommodated. For example, the control approach should accommodate the challenging electrical characteristics (e.g., slowly changing power reference, long start-up time) of the FC while still providing the power requested to the motor.

The control approach for power factor control proposed herein includes controlling the angle between the FC output voltage vector and the AC motor stator current vector, which may ensure that sufficient power is extracted from the FC during operation. For example, the angle may be controlled according to the following relation:

$$\gamma = \cos^{-1}\left(\frac{4P_{FC}}{3v_{FC}\sqrt{i_d^2 + i_q^2}}\right)$$

where $\gamma$ is the angle between an output voltage $v_{FC}$ of the FC, $$i_d^2 + i_q^2$$

is a stator current of the AC motor, and $P_{FC}$ is a power produced by the FC.

In example embodiments, the magnitude of the output voltage $v_{FC}$ of the FC may be fixed at its maximum value achievable with linear modulation, which may provide a simpler control approach. A simpler control approach may provide for a more reliable and less expensive drivetrain.

The control approach can be used to ensure that a positive non-zero minimum fuel cell power can be produced even during regenerative operation, wherein the motor power is negative. The power factor control, for example, can be adapted to keep the fuel cell from having to be shut down, which is undesirable due to the long start-up times of fuel cells.

The technical implementation of the control approach can include injecting a flux-producing current reference into the motor stator, extracting power from the FC power reference to ensure that a positive non-zero minimum FC power is extracted from the FC where the required motor current vector is too small to extract the required fuel cell power.

This ensures that the fuel cell power will not change faster than its references during occasions when there is a fast reduction in power requested from the electric vehicle traction motor, as failure to do this could result in damage to the fuel cell.

The flux-producing current reference may be defined by:

$$i_\psi^* = \sqrt{\left(\frac{4P_{FC}}{3v_{FC}}\right)^2 - |\vec{I}_{sm}|^2} \; ;$$

where $i_\psi$ is the injected flux-producing current reference, and $|\vec{I}_{sm}|$ is the required stator current vector magnitude.

According to example embodiments, fixing the output voltage $v_{FC}$ of the FC to the maximum value achievable with linear modulation may also require the injection of a smaller amount of flux-producing current reference in order to ensure that the fuel cell power reference can be met.

In another embodiment, a field weakening control approach injecting a flux producing reference into the stator of the motor is introduced to prevent saturation of the battery converter. The field weakening control approach limits the battery voltage vector magnitude to ensure compliance with motor and fuel cell power references so as to not exceed the limits of linear modulation. The field weakening control approach can aid in establishing that a high-quality motor current waveform is produced even at high speeds, thereby reducing losses and torque ripple in the motor. The proposed approach selects the maxima of flux-producing currents calculated by the power sharing approach, and the field weakening PI controller. Thus, both objectives of linear modulation for the battery converter and the fuel cell power reference can be met.

In example embodiments, the technical implementation of the control approach includes injecting the maximum flux producing current reference into the motor stator determined as a maximum of the flux producing current reference which prevents battery inverter saturation and the flux producing current reference that ensures that a positive non-zero minimum fuel cell power can be produced.

The technical implementation of the control approach of, in certain circumstances, transferring power from the FC to the battery via the flux-producing current reference without generating torque production may alleviate the challenges associated with the challenging electrical characteristics of the FC. For example, by transferring power from the FC to the battery, the FC may be prevented from shutting down, or from experiencing rapid changes to the amount of power required to be output.

The system as described can be utilized, for example, to improve various types of EVs, such as automobiles, cars, marine vessels, aircraft, among others. This is particularly useful in relation to vehicles such as trucks or buses (which drive on highways/freeways) that have a high usage rate, as it is useful to have the FC operable in respect of major power draw, and the battery used for transient power (e.g., a smaller sized battery and most of the cost on the FC, with less losses on the battery converter).

A loss analysis conducted indicated that the approaches described were useful in improving drive cycle efficiency of FC battery hybrid vehicles.

Being able to utilize two smaller modules (e.g., lower voltage modules) instead of one larger module may potentially reduce switching losses.

Further embodiments describe specific control approaches using different types of feedback controllers to control modulation approaches and inputs. These control approaches are used to generate gating modulation signals that control duty cycles, switch cycles, etc., using a series of gating pulses (e.g., based on reference values detected by the controller) to actively control electrical characteristics of the approach.

Corresponding methods, computer program products, embedded firmware, and non-transitory computer readable media storing machine interpretable instructions are contemplated. The approaches described herein can be incorporated in the form of a controller circuit that may be placed on-board a vehicle and coupled to drive systems, a drivetrain system for an EV including the controller circuit, or an EV having a drivetrain system as described in various embodiments herein. The approaches described herein can also be incorporated in the form of software or firmware instructions residing on a circuit component that can be coupled to or used as a controller circuit, implemented, using logic gates or other electrical circuitry.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1A:
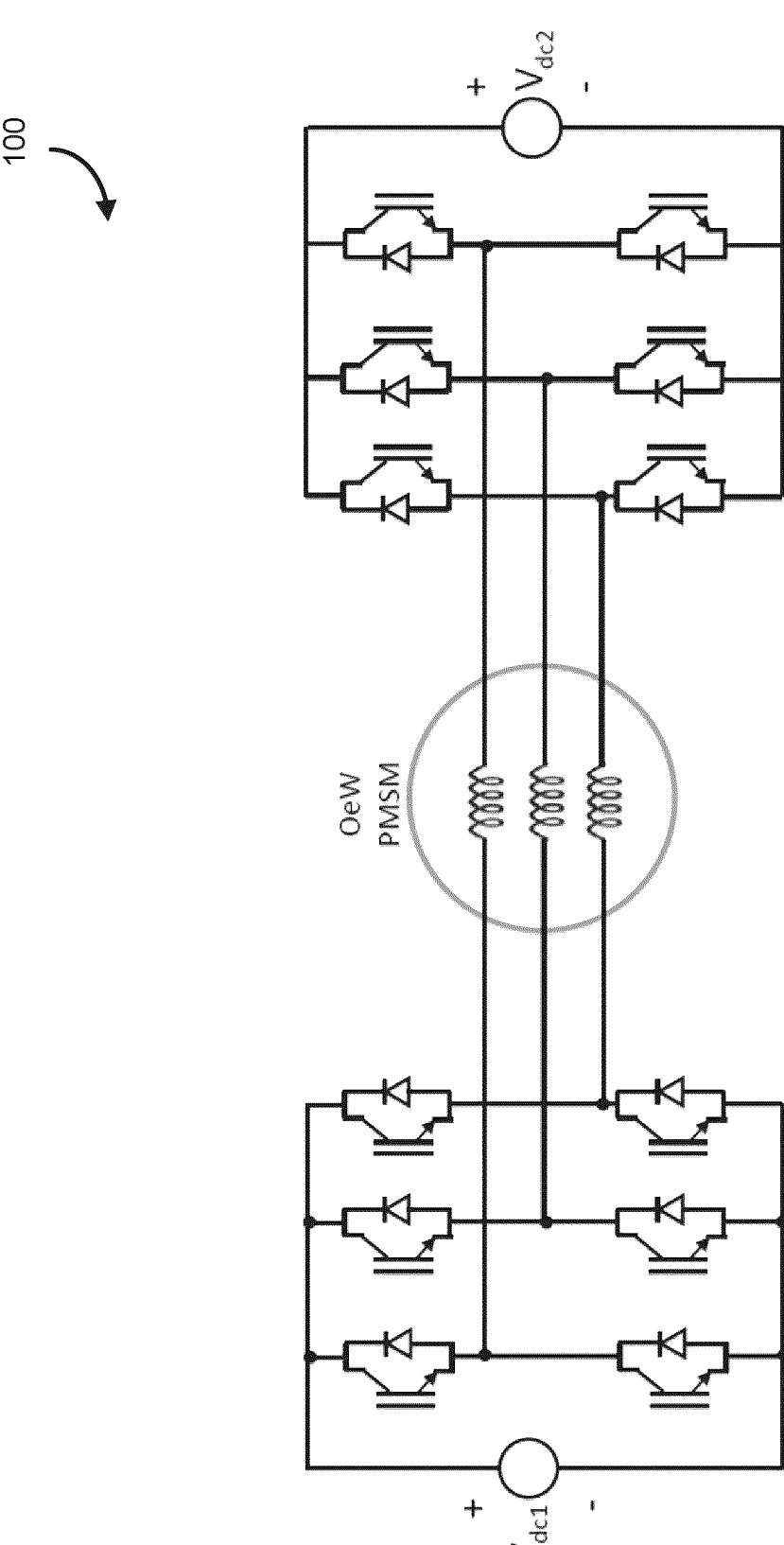
FIG. 1A and FIG. 1B are each circuit diagrams of a drivetrain topology.

Described herein are systems and methods, according to some embodiments, which integrate a fuel cell (FC) as one of two energy sources in a dual-inverter drive used to power an electric vehicle (EV). By directly integrating the FC into the drivetrain, the weight and volume of an additional magnetic energy storage stage needed in a dedicated FC direct current (DC)-DC converter is avoided.

A method of sharing power between the FC power source and a second power source (e.g., a lithium ion battery (LiB)) is introduced which may allow the dual inverter drive to be modulated to prevent the FC from absorbing power, compensate for the FC having a lower output voltage compared to the second power source and having output voltage that declines as the loading of the FC increases, ensure that the power produced by the FC is kept above a minimum value to prevent the FC from shutting down, and control the rate of change of power output by the FC to be limited to reduce the risk of damage to the FC. Both inverters are modulated to ensure that the FC matches its reference power and also the motor is able to operate at the correct power.

There are a number of different approaches described herein that can be used individually or in various combinations, according to some embodiments.

A first approach includes the implementation of power factor control to ensure that the motor power and fuel cell power references can be simultaneously met. By using power factor control to adhere to the slowly changing power reference of a FC, the FC can be integrated into the drivetrain without compromising the fast torque response needed by an EV.

A second approach includes injecting a flux-producing current reference to ensure the fuel cell power reference can be met where the required motor current vector is too small to extract the required fuel cell power. Injecting the flux-producing current reference ensures that the fuel cell power will not change faster than its references during occasions when there is a fast reduction in power requested from the electric vehicle traction motor. Failure to do this could result in damage to the fuel cell. The method of sharing power between the FC power source and a second power source in a dual inverter configuration can include fuel cell converter power factor control which ensures that a positive non-zero minimum fuel cell power is produced even during regenerative operation, wherein the motor power is negative. FC converter power factor control keeps the FC from having to be shut down, which is undesirable due to the long start-up times of fuel cells.

A third approach includes implementing a field weakening control approach which may prevent saturation of the second power source converter in cases where the second power source voltage vector magnitude needed to ensure compliance with motor and FC power references is beyond the limits of linear modulation. The field weakening control approach can enable high-quality motor current waveform production even at where the EV is operating at high speeds, thereby reducing losses and torque ripple in the motor.

Existing approaches included electric drivetrains having a DC-DC converter to connect the low voltage DC output of the FC (alternatively referred to as a fuel cell power source) to the high voltage output of the LiB to ensure that unidirectional power flow was extracted from the FC. The DC-DC converter is used to account for the downsides of FCs, namely that, compared to batteries, the power produced by a FC is unidirectional (a FC cannot absorb power), FCs stacks typically have a lower output voltage compared to EV battery packs, the output voltage declines as the loading of the FC increases, the power produced by the FC has to be kept above a certain minimum value throughout a drive cycle to ensure the FC is not shut down, and in order to reduce the risk of damage to the FC, the rate of change of fuel cell power must be limited.

However, the DC-DC converter adds weight and complexity to the drivetrain. The DC-DC converter requires a magnetic energy storage stage, either in the form of an inductor or transformer. The additional mass and volume of these devices is undesirable in an EV. In a non-limiting illustrative example, if one observes the components of a hybrid vehicle (e.g., a 2010 Toyota Prius Hybrid™), while this was not a fuel cell vehicle, it did use a low voltage battery pack which was stepped up to a higher voltage at the inverter DC link via a DC-DC converter. As such, it is a very similar configuration to the case described herein having to require a DC-DC converter. The DC-DC converter utilizes 5.1 kg of weight and 4.8 L of volume.

The proposed dual inverter approach, which is able to operate free of (e.g., does not necessarily include) a DC-DC converter, in simulations has indicated a potentially higher energy efficiency than some existing methods that use the DC-DC converter (e.g., a boost converter) to integrate the FC into an EV drivetrain, which still in example embodiments alleviating or mitigating some or all of the downsides of FCs.

The features of the proposed method of sharing power between the FC power source and a second power source in a dual inverter configuration are described in further detail below with reference to the figures. A number of variations are also described herein including several different embodiments and approaches.

Figure 1B:
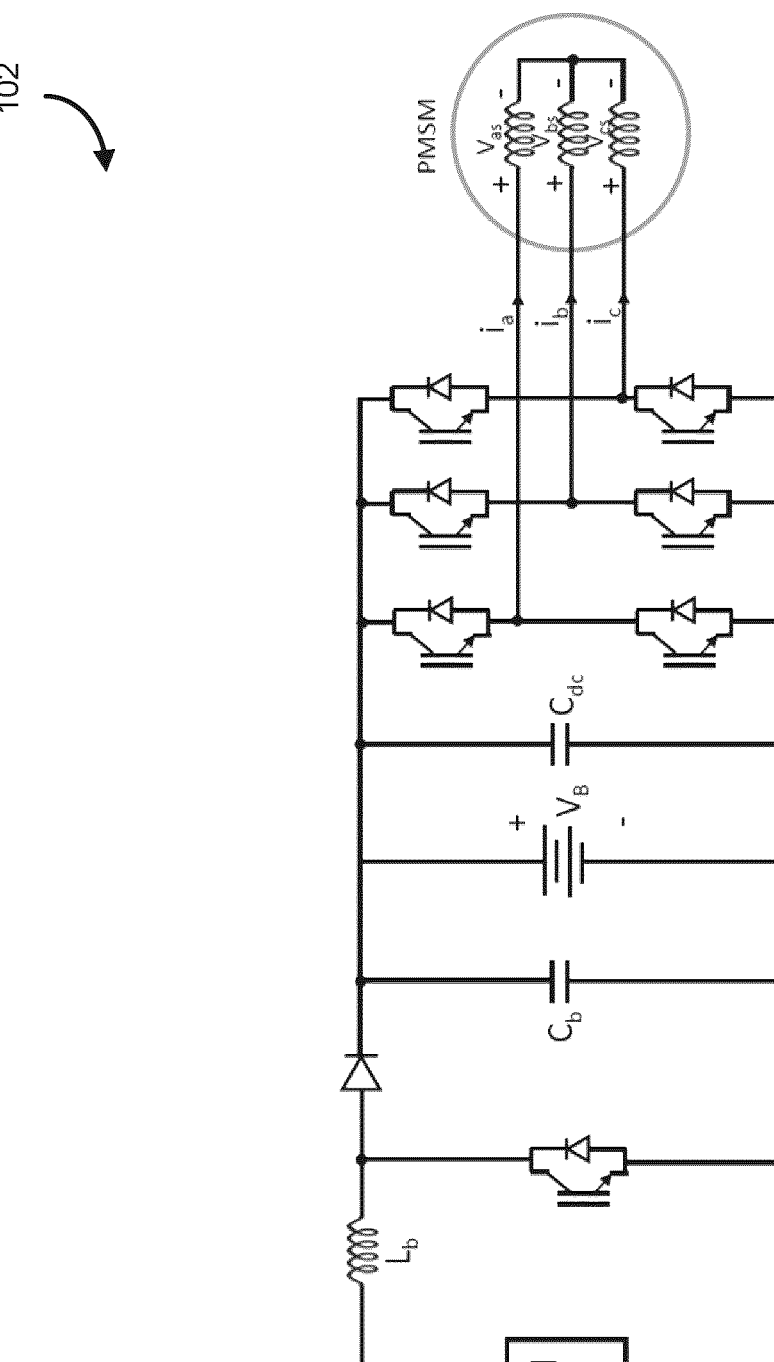

FIGS. 1A and 1B are each circuit diagrams of a drivetrain topology. FIG. 1A shows a dual inverter drivetrain topology 100, and FIG. 1B shows a second drivetrain topology 102 including a fuel cell.

Topology 100 utilizes a three-phase open-end-winding traction motor along with two inverters and DC energy sources.

This approach can accommodate a higher voltage motor in the drivetrain (thereby increasing the speed range), adding redundancy to the drivetrain, and providing the possibility to reduce bearing currents by utilizing advanced modulation techniques that eliminate the common-mode voltage applied to the motor windings.

An additional benefit of the dual inverter drivetrain, for example, the topology 100, is the possibility of utilizing different energy storage technologies on the DC-link of each inverter. One approach that has been previously studied is to use ultra capacitors on one DC link and lithium ion batteries on another. Energy management strategies have been developed which allow the ultra capacitors to supply and absorb the peak power that is produced during a driving cycle, in order to limit excessive charging and discharging of the battery.

As described herein, a challenge to be addressed relates to the integration of fuel cells as an energy source. Due to the different operating characteristics of a FC, it is difficult to ensure that the FC can always meet its reference, and a number of different practical approaches are proposed herein to address this technological challenge.

Figure 2:
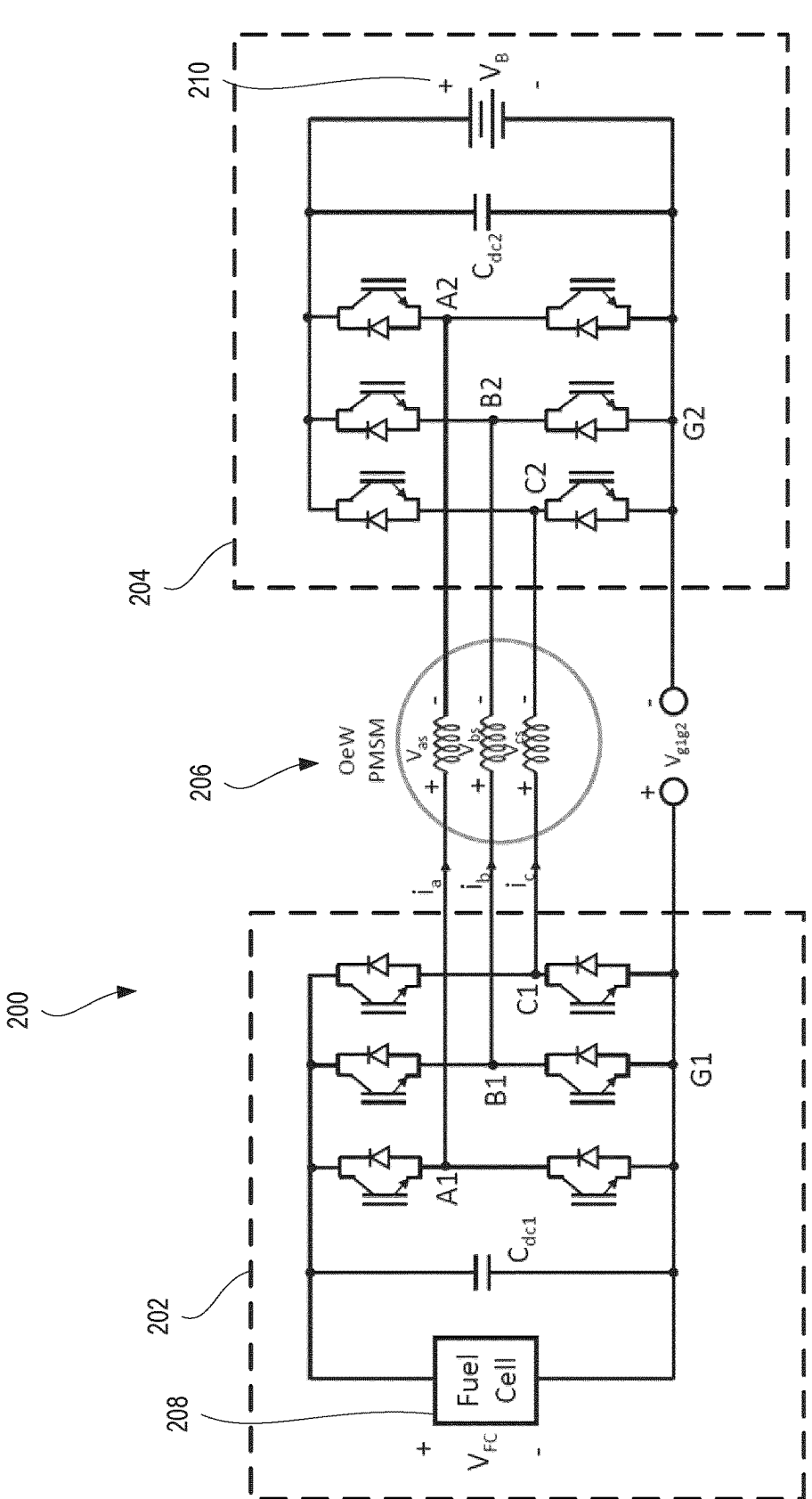
FIG. 2 is a circuit diagram of dual inverter drivetrain topology including a fuel cell, according to some embodiments.

FIG. 2 is a circuit diagram of a dual inverter drivetrain 200, according to some embodiments.

Dual inverter drivetrain 200 includes an inverter 202 associated with a FC 208 (e.g., a hydrogen fuel cell), the FC 208 integrated into the dual inverter drivetrain 200. Dual inverter drivetrain 200 further includes an inverter 204 associated with a lithium ion battery 210. Together, FC 208 and lithium ion battery 210 provide power, via the respective inverters, to power the motor 206 that is used to move EVs.

FC Modelling

The terminal voltage of a FC, such as FC 208, can be described as an open circuit voltage which was reduced under loaded conditions by voltage drops occurring due to phenomena called polarizations.

An analytical model of FC terminal voltage as a function of load current is reproduced below:

$$v_{FC} = A - B * \log\left(1 + \frac{i_{FC}}{C}\right) - De^{\frac{i_{FC}}{E}} \tag{1}$$

In this equation, A is the open circuit voltage of the stack, while, B, C, D and E are parameters related to the FC construction. In this study, the FC model utilized is based on a Ballard FCMove fuel 70 kW rated polymer electrolyte membrane (PEM) FC stack. The parameters of this FC, along with the ABCDE coefficients used to model it are shown in Table 1.

Figure 3:
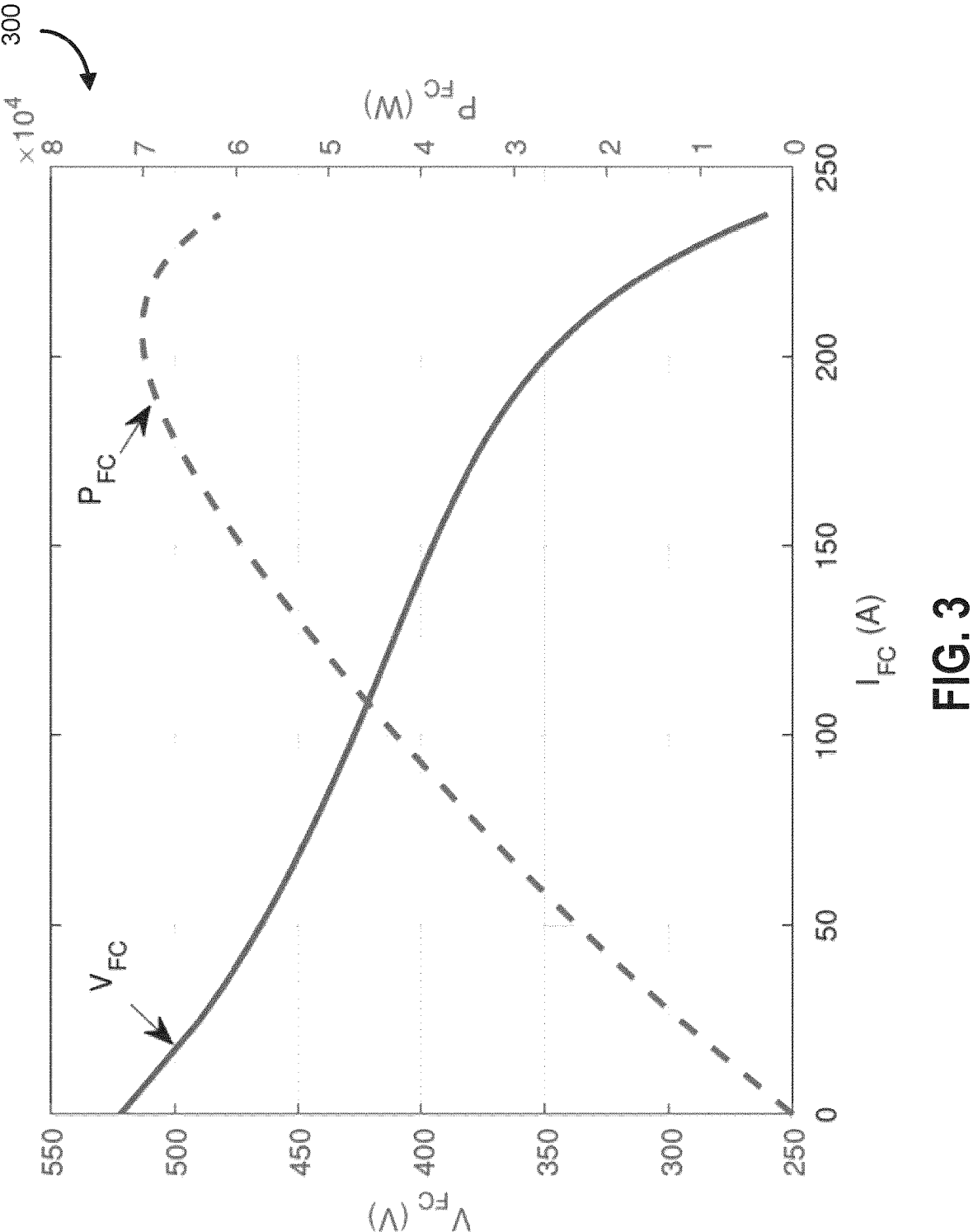
FIG. 3 is a graph of fuel cell electrical characteristics, according to some embodiments.

FIG. 3 is a graph 300 of FC characteristics, according to some embodiments.

The FC, for example, FC 208, may be a Ballard FCMove™ fuel 70 kW rated PEM FC stack, and graph 300 shows voltage versus current characteristics for said FC, along with the FC power, as a function of current.

TABLE 1

| gives the parameters of FC shown in FIG. 3: | | |
| --- | --- | --- |
| Parameter | Description | Value |
| $P_r$ | maximum power | 70 kW |
| $P_{FCmin}$ | Minimum power | 8 kW |
| $V_{FCmin}$ | Minimum voltage | 250 V |
| $V_{FCmax}$ | Maximum voltage | 500 V |
| $I_{FCmax}$ | Maximum current | 240 A |
| A | Modelling parameter | 520.8 |
| B | Modelling parameter | 104.9 |
| C | Modelling parameter | 69.57 |
| D | Modelling parameter | 0.0386 |
| E | Modelling parameter | 30 |

Analysis of the Dual Inverter Drive

The motor phase voltages in a dual inverter drive, such as motor phase voltages of the motor 206 in dual inverter drive 200, can be derived as follows:

$$v_{as} = v_{a1g1} + v_{a2g2} + v_{g1g2} \tag{2}$$

$$v_{bs} = v_{b1g1} + v_{b2g2} + v_{g1g2} \tag{3}$$

$$v_{cs} = v_{c1g1} + v_{c2g2} + v_{g1g2} \tag{4}$$

where the sunscripts of the terms concide with the locations shown in FIG. 2.

The Clarke transform can then be applied to calculate the stationary $\alpha\beta$ reference frame components of the motor phase voltage:

$$\begin{bmatrix} v_\alpha \\ v_\beta \\ v_0 \end{bmatrix} = \frac{2}{3} \begin{bmatrix} 1 & -\frac{1}{2} & -\frac{1}{2} \\ 0 & \frac{\sqrt{3}}{2} & -\frac{\sqrt{3}}{2} \\ \frac{1}{2} & \frac{1}{2} & \frac{1}{2} \end{bmatrix} \begin{bmatrix} v_{as} \\ v_{bs} \\ v_{cs} \end{bmatrix} \tag{5}$$

If equations (1-3) are substituted into (5), the common-mode voltage $v_{g1g2}$ is eliminated from the values of $v_\alpha$ and $v_\beta$. $v_\alpha$ and $v_\beta$ can be grouped into terms related to the modulation of the inverter connected to the FC (e.g., inverter 202 connected to FC 208) and the inverter connected to the battery (e.g., inverter 204 connected to secondary power source 210) as follows:

$$v_\alpha = v_{\alpha FC} + v_{\alpha Bat} \tag{6}$$

$$v_\beta = v_{\beta FC} + v_{\beta Bat} \tag{7}$$

For a given rotor position $\theta$, the rotating dq0 reference frame voltages can be obtained by multiplying the $\alpha\beta0$ voltages with a rotation matrix:

$$\begin{bmatrix} v_d \\ v_q \\ v_0 \end{bmatrix} = \begin{bmatrix} \cos\theta & \sin\theta & 0 \\ -\sin\theta & \cos\theta & 0 \\ 0 & 0 & 1 \end{bmatrix} \begin{bmatrix} v_\alpha \\ v_\beta \\ v_0 \end{bmatrix} \tag{8}$$

The values of $v_d$ and $v_q$ can also be expressed in components related to each inverter:

$$v_d = v_{dFC} + v_{dBat} \tag{9}$$

$$v_q = v_{qFC} + v_{qBat} \tag{10}$$

Figure 4:
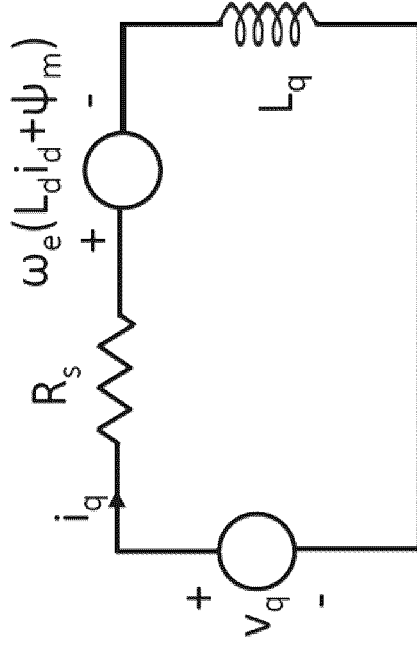
FIG. 4 is a circuit diagram of a model circuit equivalent to the circuit of FIG. 2, according to some embodiments.
Figure 4:
Figure 4:

FIG. 4 is a circuit diagram of a model circuit equivalent to the circuit of FIG. 2, according to some embodiments.

The two-axis model of a permanent magnet synchronous motor (PMSM) is shown in 400. By solving Kirchoff's Voltage Law around each circuit the following equations can be written:

$$v_d = R_s i_d + L_d \frac{di_d}{dt} - \omega_e L_q i_q \tag{11}$$

$$v_q = R_s i_q + L_q \frac{di_q}{dt} + \omega_e (L_d i_d + \psi_m) \tag{12}$$

where $\omega_e$ is the electrical frequency of the motor, and $\psi_m$ is its permanent magnet rotor flux linkage. Finally, the electromagnetic torque produced by the PMSM may be given by:

$$T_{em} = \frac{3}{2} p[\psi_m i_q - (L_q - L_d) i_d i_q] \tag{13}$$

where p is the number of motor pole pairs.

Control Methodology

Figure 5:
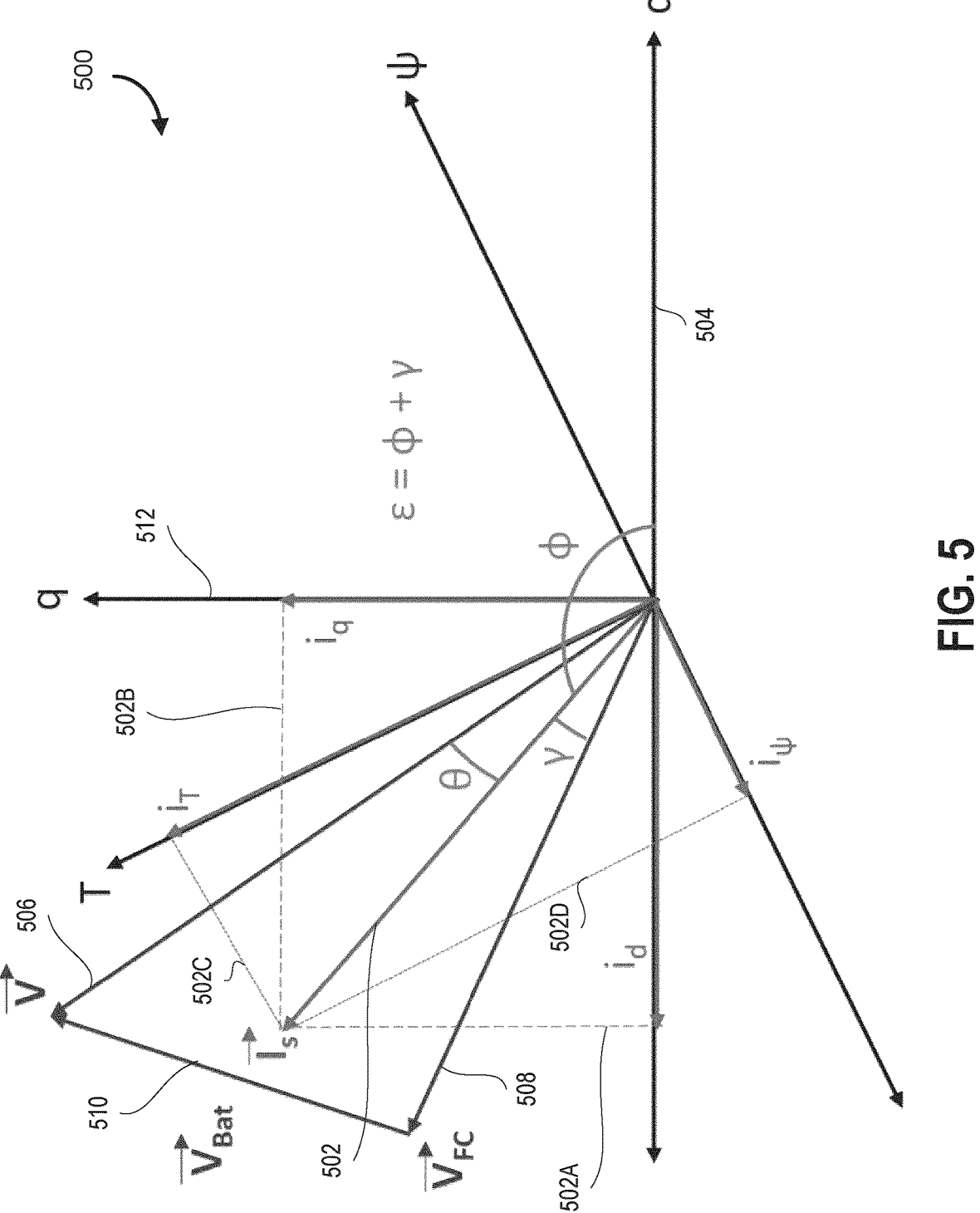
FIG. 5 is a vector diagram of characteristics of the circuit of FIG. 2 during operation, in a rotating reference frame, according to some embodiments.

FIG. 5 is a vector diagram 500 of the characteristics of dual inverter system 200 during operation, according to some embodiments.

The stator current vector ($\vec{I}_s$) 502 may be represented in terms of its projections 502A and 502B onto the rotating reference frame (dq axis, via $i_d$ and $i_q$, respectively), as well as its projections 502C and 502D onto the torque and flux producing reference frame ($T_\psi$), via $i_T$ and $i_\psi$, respectively). This description may be valid for salient PMSMs, wherein the q and d axes do not contribute towards torque and flux production exclusively. The angle of the stator current vector 502 relative to the d axis 504 is defined as $\phi$.

Also shown in 500 are the stator voltage vector ($\vec{V}$) 506, and the voltage vectors produced by the two-level inverters connected to the fuel cell ($\vec{V}_{FC}$) 508 and the battery ($\vec{V}_{Bat}$) 510. The angle between the stator voltage 506 and current vectors is defined as $\theta$, while the angle between the fuel cell voltage vector 508 and stator current vectors 502 is called $\gamma$. The angle between the $\vec{V}_{FC}$ 508 and the d axis 504 is defined as $\epsilon$.

Figure 6:
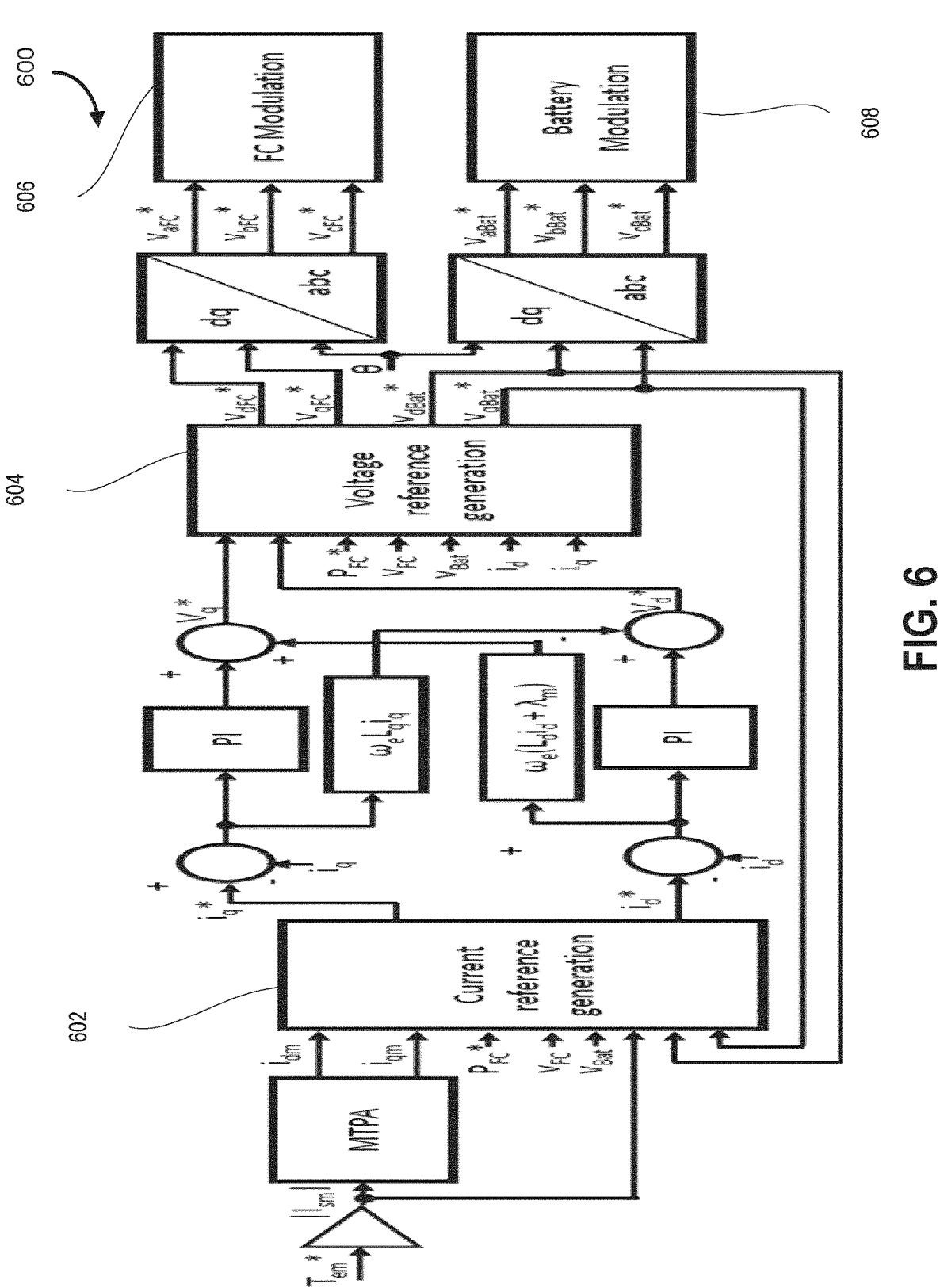
FIG. 6 is a control diagram for an example control mechanism for controlling the circuit of FIG. 2, according to some embodiments.

FIG. 6 is a control diagram 600 of the dual inverter drive circuit of FIG. 2, according to some embodiments. Control diagram 600 shows current controller 602 for generating current references, voltage controller 604 for generating voltage references, and battery and FC modulation controllers 608 and 606 respectively. In FIG. 6, a control circuit is shown whereby the angle gamma is controlled by determining desired voltage references for the fuel cell and the battery based on the overall voltage references that are obtained by the controllers.

In a first example, for a given operating point, assume that there does not need to be any current injection, and one is able to generate the fuel cell reference power with that value of current. In that case, the first block, MTPA will generate some current references for the amount of torque that are desired.

The current reference generation block, 602, will not do anything (it operates when one needs injection). The section in the middle—circles of the subtraction, PI blocks, these are controllers and for a certain amount of direct and quadrature current, these controllers will compute how much voltage in the direct and quadrature axis needs to be applied to the motor.

The voltage reference generation block 604 will calculate the split of voltage (direct and quad) to the fuel cell converter and the battery converter. It does this based on the reference of power for the FC and also the measured voltage of the FC, battery, and the measured direct and quad currents. The voltage reference generation block 604 then outputs the references, and then at that point, there are modulation blocks that convert those references to gating signals for the power electronics of those converters.

In terms of gamma, gamma is effectively the angle between the fuel cell voltage and motor current vectors. The motor current vector changes based on how much torque is requested by the user, and as the other inputs to 604 change, the system adjusts the $v_{dfc}$ and $v_{qfc}$ to change gamma/change Pfc, adjusting battery power in order to provide the difference in power between what the motor requires and what the FC requires.

Current Reference Generation

Figure 7:
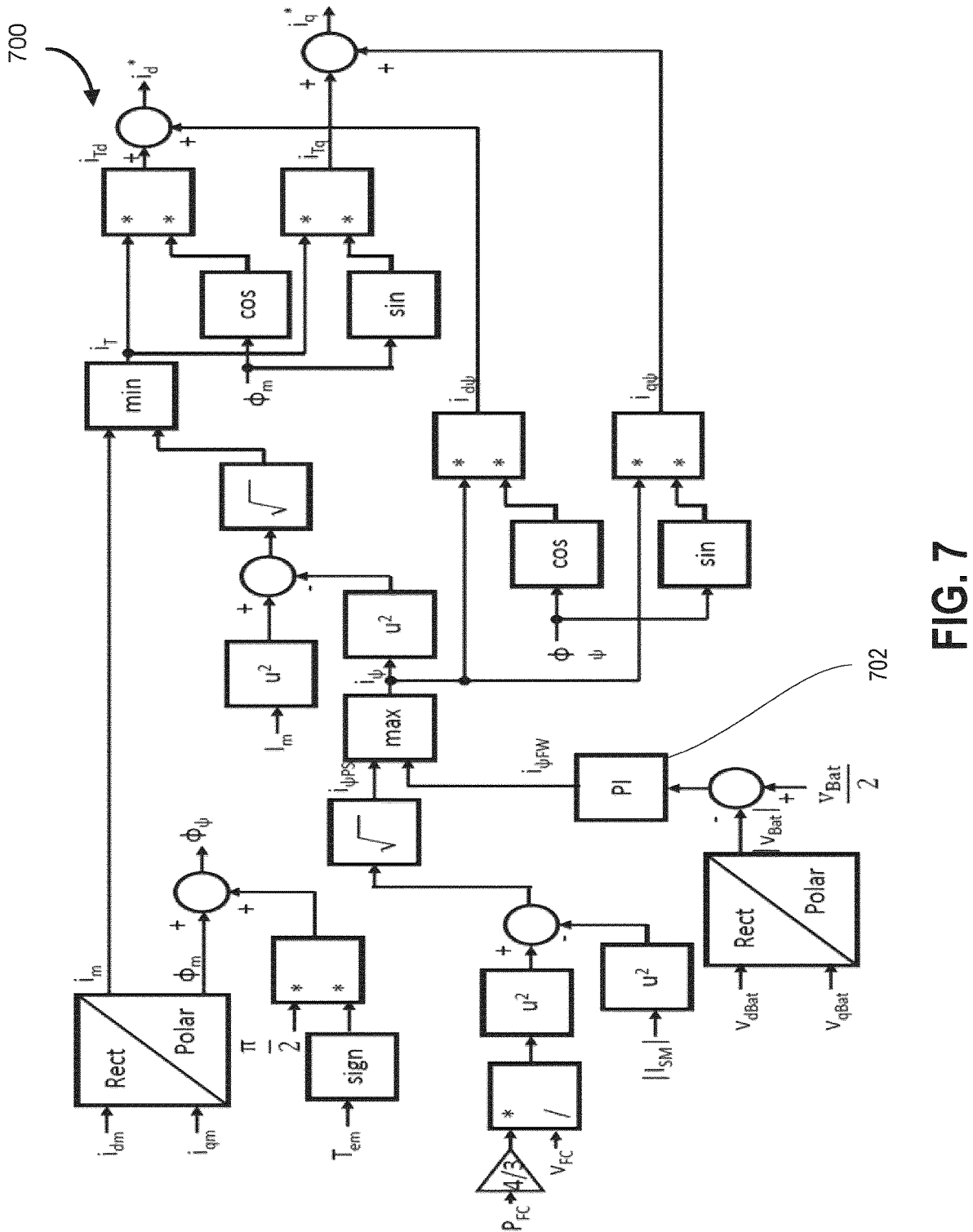
FIG. 7 is a block diagram illustrative of the current controller (current reference generation) of FIG. 6, according to some embodiments.

FIG. 7 is a block diagram 700 illustrative of the current controller 602 of FIG. 6. Block diagram 700 describes the constituent procedures and elements of the current controller 602 operating in accordance with an example control approach.

Block diagram 700 also illustrates how the flux-producing current reference may be generated (both in cases where the FC power reference is greater than the motor power, and when field weakening is required to keep the battery converter from saturating) according to example embodiments.

In a PMSM, the required stator current vector 502 magnitude assuming maximum-torque-per-ampere (MTPA) operation may be:

$$|\vec{I}_{sm}| = \min\left( \left| \frac{2T_{em}}{3p\psi_m} \right|, I_m \right) \tag{14}$$

Where $I_m$ is the current limit of the dual inverter drivetrain 200. There may be another component of torque not due to magnets (e.g., due to saliency), and this may be missing from Equation (14). This component is known as the reluctance torque, which would be another factor to be a reduction from Equation (14)—e.g., a Equation (14) may yield too large of a current vector magnitude for a given torque.

For a required current vector $\vec{I}_{sm}$ 502, the d-axis MTPA current can be obtained from:

$$i_{dm} = \frac{\psi_m}{4(L_q - L_d)} - \sqrt{\frac{\psi_m^2}{16(L_q - L_d)^2} + \frac{|\vec{I}_{sm}|^2}{2}} \tag{15}$$

The q-axis (axis 512 in FIG. 5) MTPA current is then found by:

$$i_{qm} = \sqrt{|\vec{I}_{sm}|^2 - i_{dm}^2} \tag{16}$$

These d and q axis MTPA currents will impose an MTPA current vector angle (using the four-quadrant inverse tangent):

$$\phi_m = \tan^{-1}\left(\frac{i_{qm}}{i_{dm}}\right) \tag{17}$$

As the MTPA current vector is solely along the T-axis of 500, $\phi_m$ represents the angle between the d-axis 504 and the T-axis The flux producing current will be at an angle of $$\frac{\pi}{2}$$

radians from $\phi_m$. The direction of rotation depends on the sign of the electromagnetic torque reference, and may be given by:

$$\phi_\psi = \text{sign}(T_{em}) * \frac{\pi}{2} + \phi_m \tag{18}$$

Generation of dq Current References

The electrical power of the PMSM can be expressed in the dq frame as:

$$P_{tot} = \frac{3}{2}[v_d i_d + v_q i_q] \tag{19}$$

The FC may be required to provide a certain output power ($P_{FCmin}$) at all times during operation to ensure it is not shut down, and therefore controlling the dual inverter drive 200 when $P_{tot} < P_{FCmin}$ to avoid shutdown is desirable.

The power produced by the fuel cell converter under MTPA conditions can be obtained as:

$$P_{FC} = \frac{3}{2}|\vec{V}_{FC}||\vec{I}_{sm}|\cos(\gamma) \tag{20}$$

where $|\vec{V}_{FC}|$ is the magnitude of the FC voltage vector, $|\vec{I}_{sm}|$ is stator current vector magnitude for MTPA operation $\gamma$ is the angle between these two vectors.

From (20) it is clear that $P_{FC}$ can be controlled either by the magnitude of the voltage and current vectors, or the angle between them. In example embodiments, the dual inverter drive 200 operates with $|\vec{V}_{FC}|$ at its maximum value achievable with linear modulation, given by:

$$|\vec{V}_{FC}| = \frac{v_{FC}}{2} \tag{21}$$

An additional benefit in this approach may be that the required stator current injection to transfer power when $|\vec{I}_{sm}|$ is too small will be reduced.

If (20)-(21) are combined, it is possible to derive the angle $\gamma$ which should exist between the fuel cell voltage and stator current vectors:

$$\gamma = \cos^{-1}\left(\frac{4P_{FC}}{3v_{FC}|\vec{I}_{sm}|}\right) \tag{22}$$

It should be noted that $\gamma$ is imaginary when the argument of (22) has a magnitude greater than 1. This condition indicates that the magnitude of the current vector is to small to generate the requested FC power. In this case, the required $i_\psi$ injection required to ensure the requested fuel cell power can be generated is (using a complex conjugate):

$$i_\psi^* = \sqrt{\left(\frac{4P_{FC}}{3v_{FC}}\right)^2 - |\vec{I}_{sm}|^2} \tag{23}$$

Equation (23) describes how the flux-producing current is generated, for cases where the fuel cell power reference is greater than the motor power. Once this reference is known, the d and q axis currents which contribute towards this required flux-producing current can be derived as:

$$i_{d\psi}^* = i_\psi^* \cos \phi_\psi \tag{24}$$

$$i_{q\psi}^* = i_\psi^* \sin \phi_\psi \tag{25}$$

The maximum available current for torque production based on a particular flux-producing current and drive current limit can be given by:

$$\hat{i}_m = \sqrt{I_m^2 - i_\psi^{*2}} \tag{26}$$

Where $I_m$ is the current limit of the drive system. The required torque producing current may then be found by saturating the MTPA current vector length by the value of $\hat{i}_m$:

$$i_T = \min(|\vec{I}_{sm}|, i_m) \tag{27}$$

Using this value, the final dq components of the torque producing current are expressed as:

$$i_{Td}^* = i_T^* \cos \phi_m \tag{28}$$

$$i_{Tq}^* = i_T^* \sin \phi_m \tag{29}$$

And the current references in the dq reference frame are:

$$i_d^* = i_{Td}^* + i_{d\psi}^* \tag{30}$$

$$i_q^* = i_{Tq}^* + i_{q\psi}^* \tag{31}$$

Voltage Reference Generation

Figure 8:
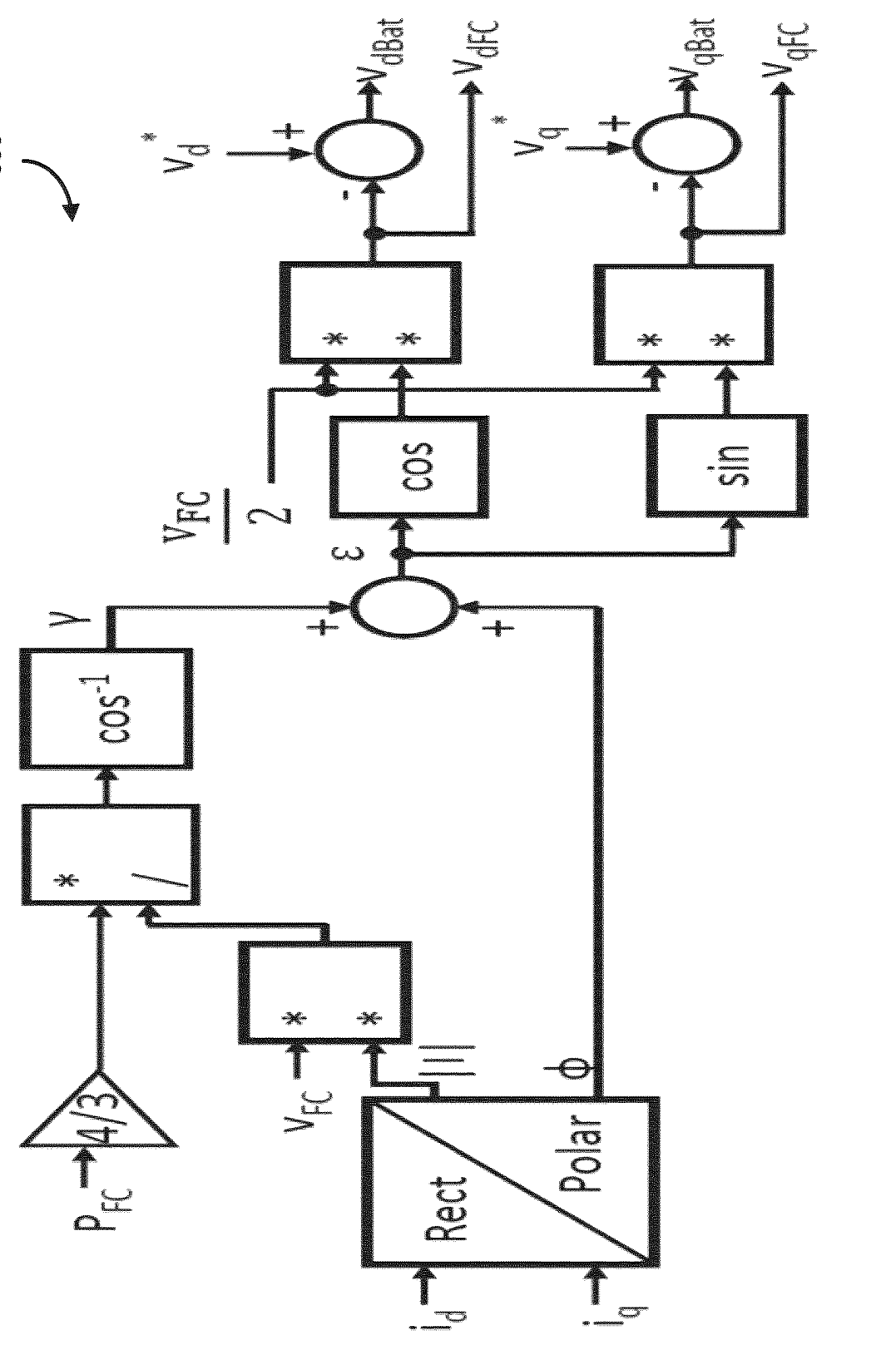
FIG. 8 is a block diagram illustrative of the voltage controller (voltage reference generation) of FIG. 6, according to some embodiments.

FIG. 8 is a block diagram 800 illustrative of the voltage controller 604 of FIG. 6, according to some embodiments.

Block diagram 800 shows the control approach for generating the dq frame voltage references for the secondary fuel source and fuel cell inverters (respectively, 204 and 202) based on the power requirements of the FC 208. The required angle $\gamma$ between the FC voltage and stator current vectors for power sharing can then be computed, using measured $i_d$ and $i_q$ values:

$$\gamma = \cos^{-1}\left(\frac{4P_{FC}}{3v_{FC}\sqrt{i_d^2 + i_q^2}}\right) \tag{32}$$

Equation (32) describes how the angle between the FC voltage and stator current vectors, 508 and 502, may be derived, according to some embodiments. The angle of the FC voltage vector 508 relative to the d axis 504 may be given by (using the four-quadrant inverse tangent):

$$\epsilon = \gamma + \tan^{-1}\left(\frac{i_q}{i_d}\right) \tag{33}$$

The required dq components of the FC voltage vector 508 may then be obtained by:

$$v_{dFC} = \frac{v_{FC}}{2}\cos(\epsilon) \tag{34}$$

$$v_{qFC} = \frac{v_{FC}}{2}\sin(\epsilon) \tag{35}$$

The required dq voltages from the battery inverter 204 can then be calculated from (9) and (10).

Field-oriented control may be used, with additional computations to ensure that the FC tracks its power reference regardless of the overall power requested by the torque reference of the dual inverter drive 200. This may be achieved by requesting an injection of $i_\psi$ in cases where the drive requested power is less than the FC power reference. The introduction of $i_\psi$ permits power transfer from FC to battery without associated torque production.

Field Weakening Control

Given that the fuel cell inverter 202 has been constrained to operate at its maximum modulation index, at higher speeds it is possible for the values of $v_{dBat}$ and $v_{qBat}$ to exceed the limits for linear modulation. As a result, a field weakening controller may be used to generate a flux-producing current reference $i_{\psi FW}{}^*$ when the battery voltage reference is greater than the limit for linear modulation.

The field weakening controller may be a proportional integral (PI) regulator (e.g., PI regulator 702 of FIG. 7) which outputs a flux-producing current magnitude reference $$i_{\psi FW}^*.$$

Ultimately, the maxima of $$i_{\psi FW}^*$$

and the flux-producing current calculated by the power sharing control approach in (23) (which is defined as $$i_{\psi PS}^*$$

in 700) is selected as the final flux-producing current reference, and is used in (24-26).

Influence of Regeneration on Operating Limits

During regenerative operation, the angle between the motor voltage and current vectors will be greater than $\pi$ radians in order to ensure that active power is absorbed from the motor 206. The angle between the fuel cell voltage 508 and motor current vectors however must be less than $\pi$ radians, to ensure that real power continues to be extracted from the fuel cell 208. These contradictory requirements on the fuel cell voltage 508 and motor voltage vectors will place difficult constraints on the voltage limit of the battery inverter 204.

The voltage limit for linear modulation of the battery inverter 204 may be given by:

$$\frac{v_{bat}}{2} = \sqrt{(v_d - v_{dfc})^2 + (v_q - v_{qfc})^2} \tag{36}$$

The above equation can be rearranged to the following form:

$$v_d^2 + v_q^2 = \left(\frac{v_{bat}}{2}\right)^2 - \left(v_{dfc}^2 + v_{qfc}^2\right) + 2(v_{dfc}v_d + v_{qfc}v_q) \tag{37}$$

Which can be rearranged to:

$$\omega_e^2\left[(\lambda_m + L_d i_d)^2 + (L_q i_q)^2\right] = \frac{v_{bat}^2}{4} - \frac{v_{FC}^2}{4} + 2(v_{dfc}v_d + v_{qfc}v_q) \tag{38}$$

The right hand side of the above equation can be called $$V_{avail}^2.$$

Taking this into account, above equation can be rearranged to give the equation of an ellipse:

$$1 = \frac{\left(i_d + \frac{\psi_m}{L_d}\right)^2}{\left(\frac{V_{avail}}{\omega_e L_d}\right)^2} + \frac{(i_q)^2}{\left(\frac{V_{avail}}{\omega_e L_q}\right)^2} \tag{39}$$

The ellipse has a fixed center point, but major and minor axes which change based on the relative signs of the fuel cell d and q components.

Figure 9:
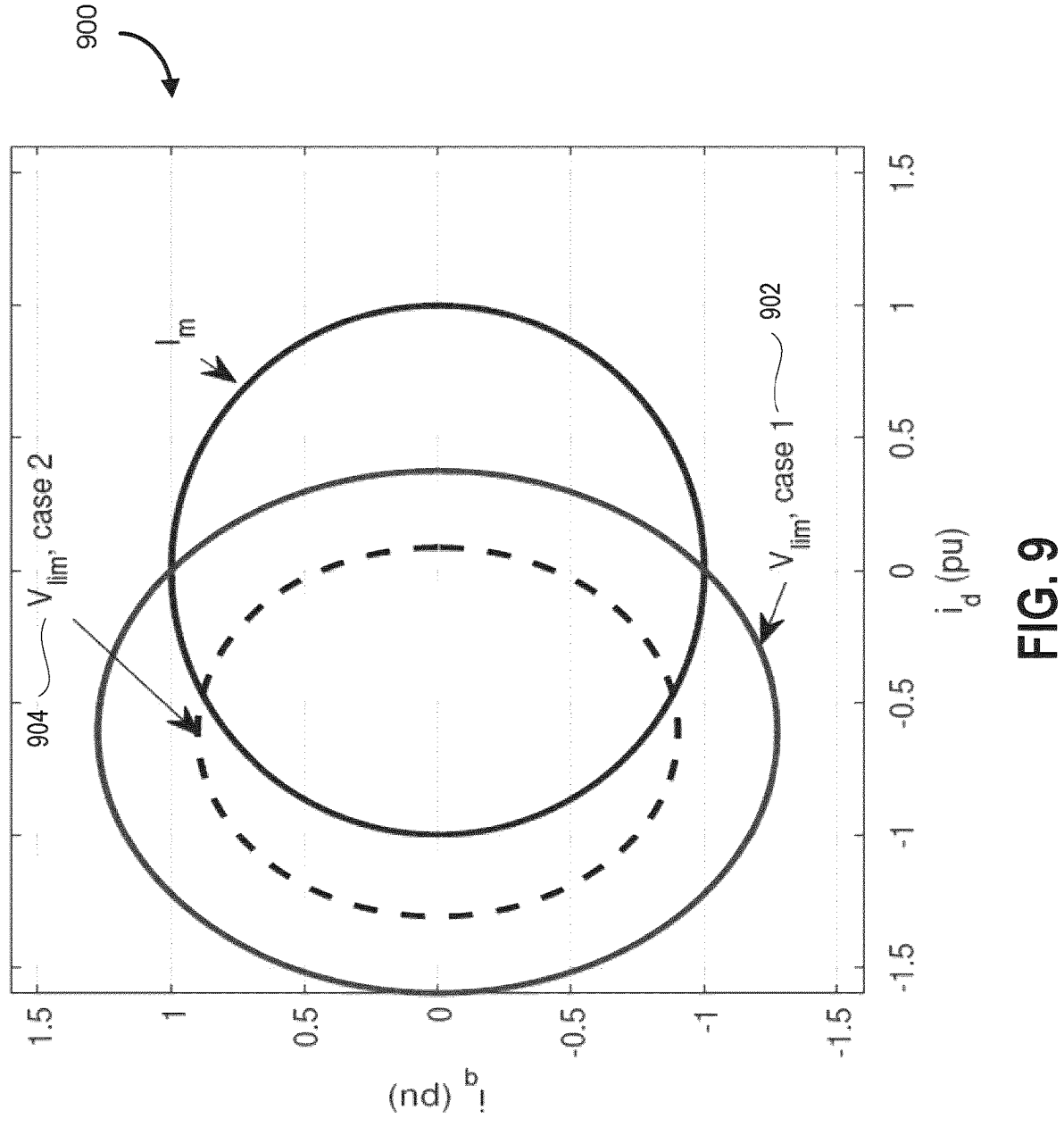
FIG. 9 is a graph illustrative of the current and voltage ellipses of the circuit of FIG. 2 during operation, according to some embodiments.
Figure 10A:
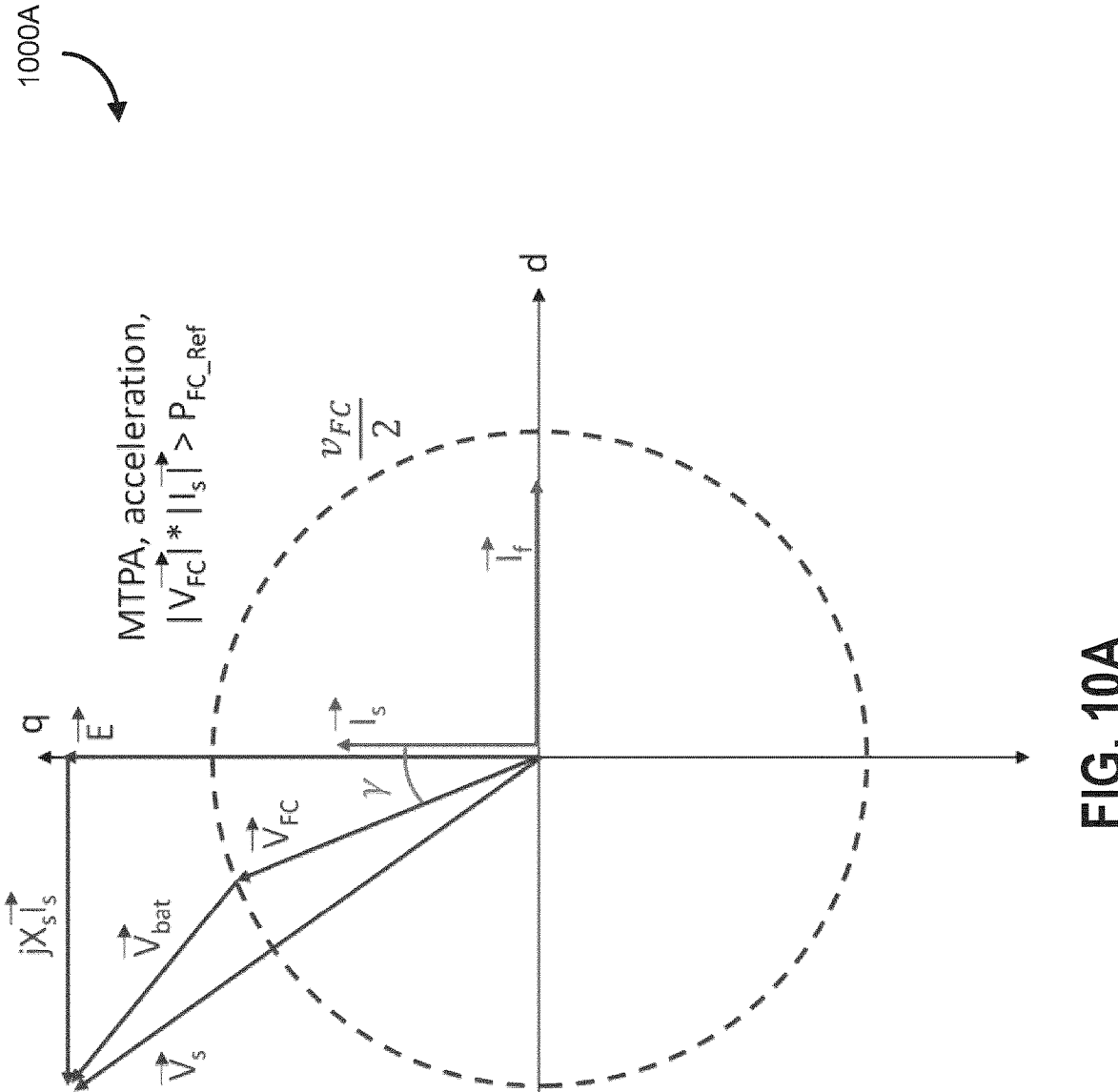
FIGS. 10A, 10B, 10C, 10D are each a diagram illustrative of maximum-torque-per-ampere of the circuit of FIG. 2 in operation, according to some embodiments.
Figure 10B:
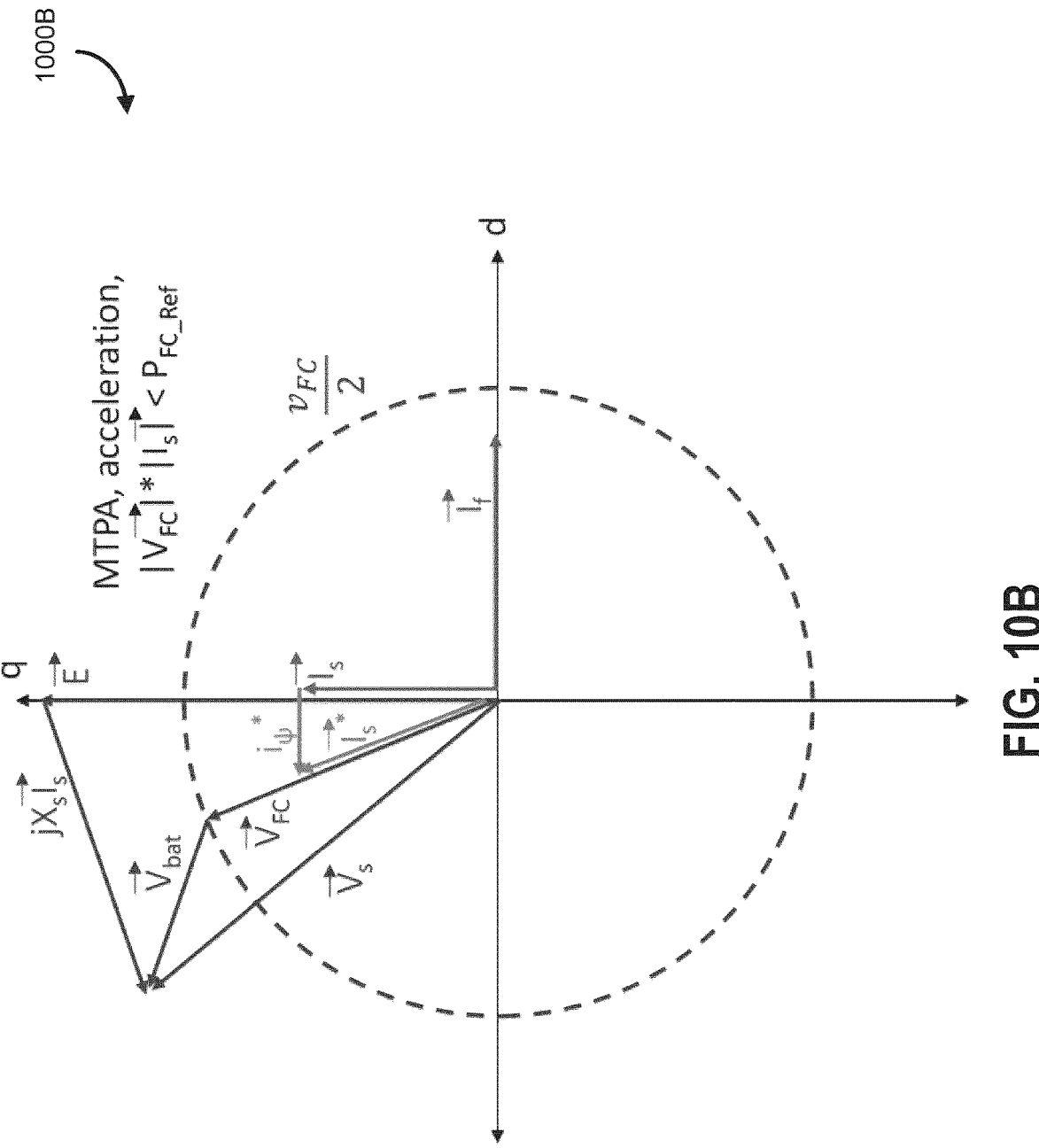
Figure 10C:
Figure 10D:
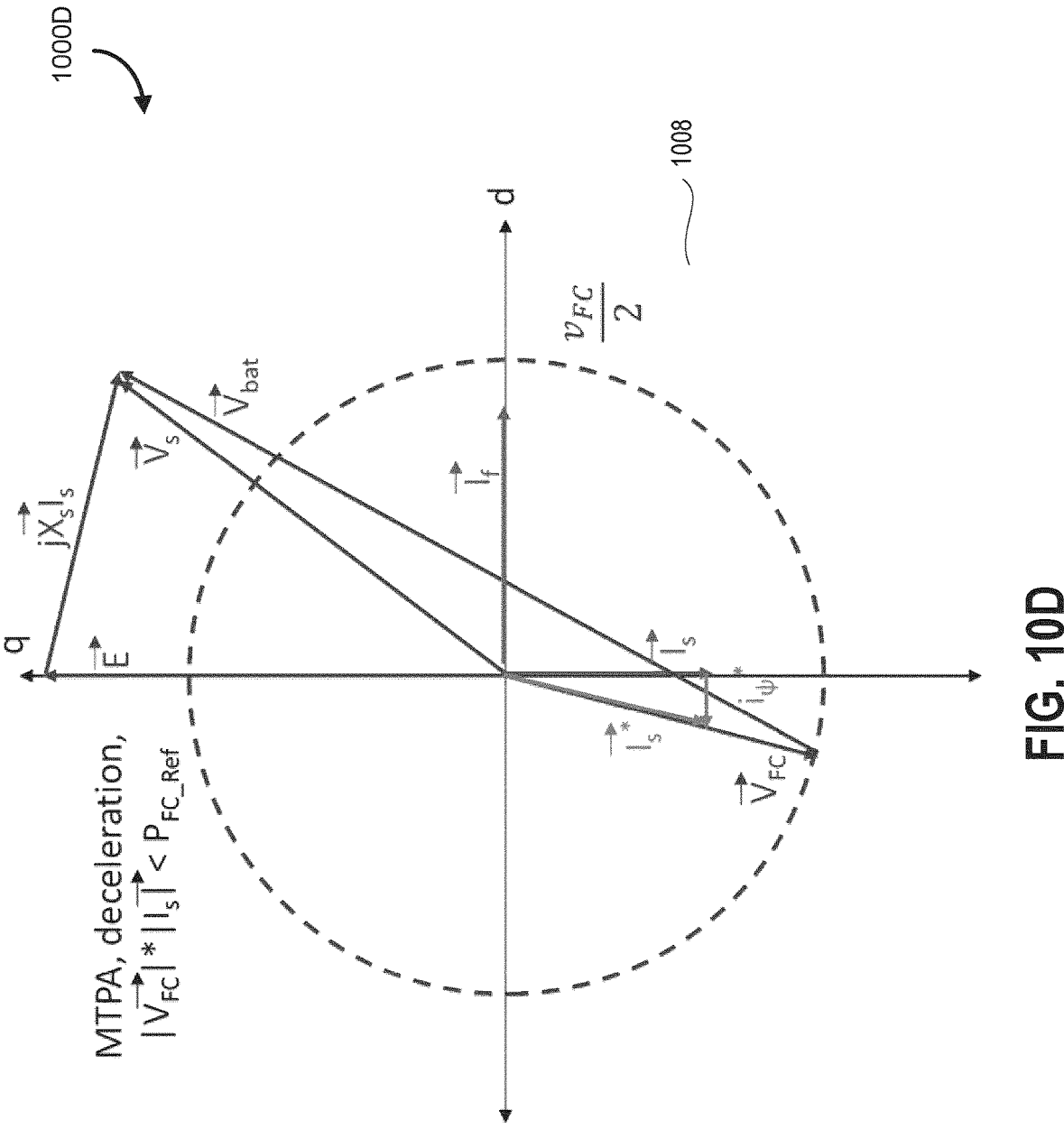

This phenomenon may be best illustrated via FIG. 9, which shows a graph 900, illustrative of the current and voltage ellipses of the circuit of FIG. 2 in operation, according to some embodiments.

Two cases can be seen in 900: case 902, where drive voltage and current limits are shown where the motor 206 operates at base drive speed and where the fuel cell voltage vector fully supports the motor voltage vector, and case 904, where a 60 degree shift exists between fuel cell voltage and motor current vectors. In both cases, the motor voltage vector is 1∠120 pu, while the motor 206 is defined to operate at base speed (the speed at which field weakening is entered). For this example, the maximum fuel cell and battery voltage vector lengths are 0.5 pu.

In the first case 902, both the fuel cell and battery voltage vectors have values of 0.5∠120 pu. For the second case 904, the fuel cell voltage vector has a value of 0.5∠180 pu. Due to the discrepancy in angles of the fuel cell and motor voltage vectors of this case, the ellipse encapsulating the dq current values that can achieve this operating point in graph 900 is reduced in area. This indicates that the maximum torque-producing current achievable will be reduced whenever the fuel cell and motor voltage vectors do not point in the same direction. This scenario typically occurs during regenerative operation.

The field weakening controller shown in 702 handles the reduced operating voltage range during regeneration by requesting an increased magnitude of flux-producing current to be used.

Vector Diagrams

FIGS. 10A to 10D are each a graph illustrative of maximum-torque-per-ampere of the circuit of FIG. 2 in operation. Graph 1000A shows the performance of the proposed current sharing control approach during acceleration where the total drive requested power is greater than the fuel cell minimum power ($P_{FCmin}$). Graph 1000B shows the performance of the proposed current sharing control approach during acceleration where the total power is less than $P_{FCmin}$. Graph 1000C shows the performance of the proposed current sharing control approach during deceleration where the total power is greater than the $P_{FCmin}$, and graph 1000D shows the performance of the proposed current sharing control approach during deceleration where the total power is less than $P_{FCmin}$.

Additionally, graphs 1000A to 1000D show what the injection of current may look like from a vectorial perspective.

For clarity of representation, these graphs 1000A to 1000D are drawn based on the assumptions that the motor 206 under study has no saliency or stator resistance and hence the stator voltage drop can be represented by $j\omega L_s|I_s|$. where $L_d = L_q = L_s$.

In graph 1002, (32) is used to calculate the angle $\gamma$ required to deliver the requested fuel cell power. For graph 1004, the magnitude of the stator current vector $|I_s|$ is too small to generate $P_{FCmin}$ so an additional flux-producing current is injected. Graph 1006 mirrors graph 1002, except that the fuel cell voltage vector points in the negative q direction due to the necessity of maintaining positive $P_{FCmin}$. This constraint results in a larger battery voltage vector magnitude $|V_{bat}|$ being required. Graph 1008 mirrors graph 1004 in that an additional flux-producing current is injected to ensure that $|I_s|$ is large enough to ensure that $P_{FCmin}$ can be extracted from the fuel cell.

Simulations

Vehicle Modeling

A modelling the mechanical load imposed on the motor 206 by the physical parameters of an EV can be performed to arrive at an evaluation of the power sharing control approach's efficacy in operating a model dual inverter drivetrain 200. The method proposed is used to determine an equivalent inertia of the EV that can be applied to a shaft of motor 206 (e.g., a PMSM shaft).

Firstly, an equivalent mass of the EV may be determined from:

$$m_e = (1 + 0.04 + 0.0025 G^2)m \qquad (40)$$

where m is the actual vehicle mass and G is the gear ratio.

The rotational inertia at the wheels of the EV can then be computed from:

$$J_w = m_e r_w^2 \qquad (41)$$

where $r_w$ is the EV wheel radius.

Finally, the equivalent inertia at the shaft of the motor 206 can be found from:

$$J_m = \frac{J_w}{G^2} \qquad (42)$$

The load torque used in the model dual inverter drivetrain 200 may be calculated based on the mechanical losses encountered by the EV due to rolling friction and air drag:

$$P_L = v[v^2(0.5\rho C_d A_f) + C_r mg] \qquad (43)$$

where v is the EV velocity, $C_d$ is the drag coefficient, $\rho$ is the air density, $C_r$ is the rolling friction coefficient, and g is the acceleration due to gravity.

The load torque required may then be computed by:

$$T_L = \frac{P_L}{\frac{Gv}{r_w}} \qquad (44)$$

The electromagnetic torque reference used by the current controller 602 described in FIG. 6 may be obtained by:

$$T_{em}^* = T_L + J_m \frac{a_{EV}}{\frac{Gv}{r_w}} \qquad (45)$$

where $a_{EV}$ is the acceleration of the EV.

Fuel Cell Power Reference

Figure 11:
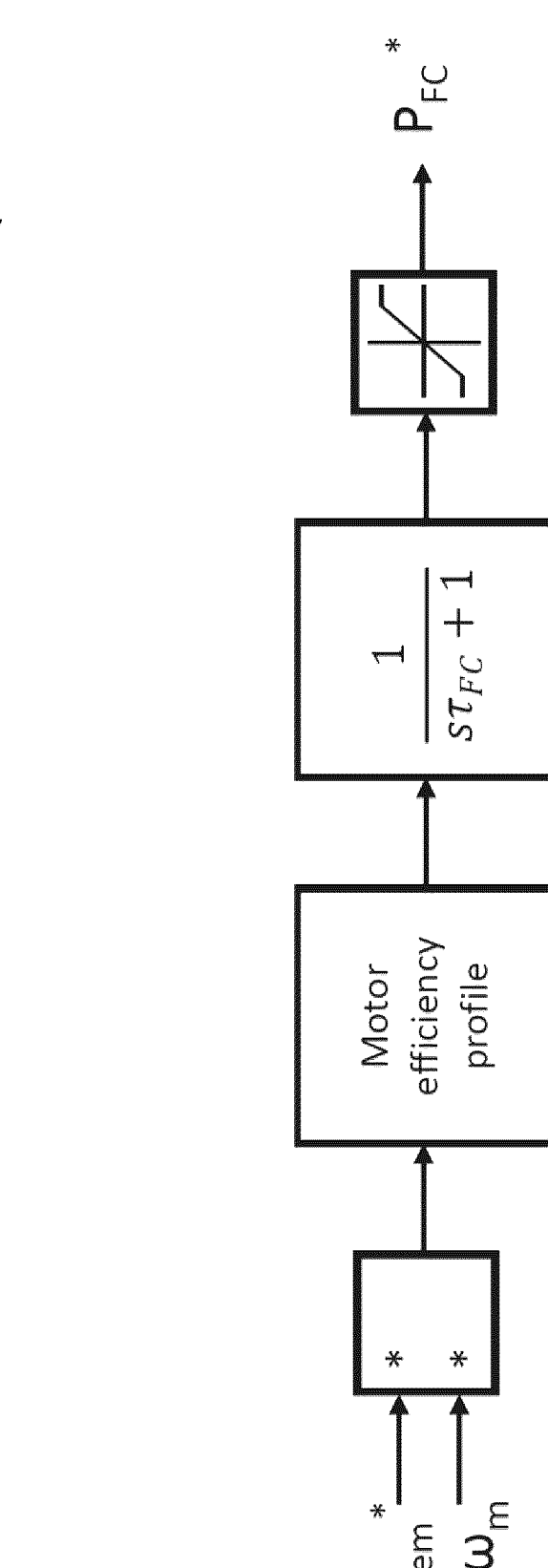
FIG. 11 is a control diagram for controlling fuel cell power reference generation, according to some embodiments.

FIG. 11 is a control diagram 1100 for controlling fuel cell power reference generation, according to some embodiments.

The fuel cell power reference may be generated based on the electromagnetic torque reference and the efficiency profile of the motor 206. A low pass filter may be used to slow down the dynamics of the fuel cell power reference, and the output of this filter may be limited to the bounds of power achievable by the FC 208. As stated in the fuel cell modelling section, the minimum power of the fuel cell was limited to 8 kW.

As can be seen in diagram 800, the fuel cell power reference is utilized by the power sharing control approach when calculating the required angle $\gamma$ which is imposed between the stator current and fuel cell voltage vectors.

Simulation Results

Table 2 shows the parameters used in the simulation dual inverter drivetrain 200.

| Parameter | Description | Value | |
|---|---|---|---|
| P | motor pole pairs | 5 | |
| $L_d$ | motor d-axis inductance | 0.943 | mH |
| $L_q$ | motor q-axis inductance | 0.73 | mH |
| $v_m$ | motor magnet flux linkage | 0.127 | Wb |
| $R_s$ | motor stator resistance | 45 | m$\Omega$ |
| $I_m$ | motor stator current limit | 220 | A |
| $V_{bat}$ | Nominal battery voltage | 400 | V |
| $R_{bat}$ | Battery series resistance | 100 | m$\Omega$ |
| $f_{sw}$ | Switching frequency | 10 | kHz |
| $J_{em}$ | equivalent inertia | 3.162 | kgm$^2$ |
| $A_f$ | Vehicle frontal area | 2.3 | m$^2$ |
| $r_w$ | Vehicle wheel radius | 0.316 | m |
| G | Vehicle gear ratio | 7.94 | |
| m | Vehicle mass | 2000 | kg |

-continued

| Parameter | Description | Value |
|-----------|-------------|-------|
| $C_d$ | Air drag coefficient | 0.417 |
| $C_r$ | Rolling resistance coefficient | 0.009 |
| $\tau_{FC}$ | FC controller time constant | 1 s |

The performance of the power sharing control approach was evaluated by performing a sequence of accelerating the vehicle for one second, cruising for two seconds then decelerating for one second. The initial cruising speed of the EV in this study was 100 km/H.

Figure 12:
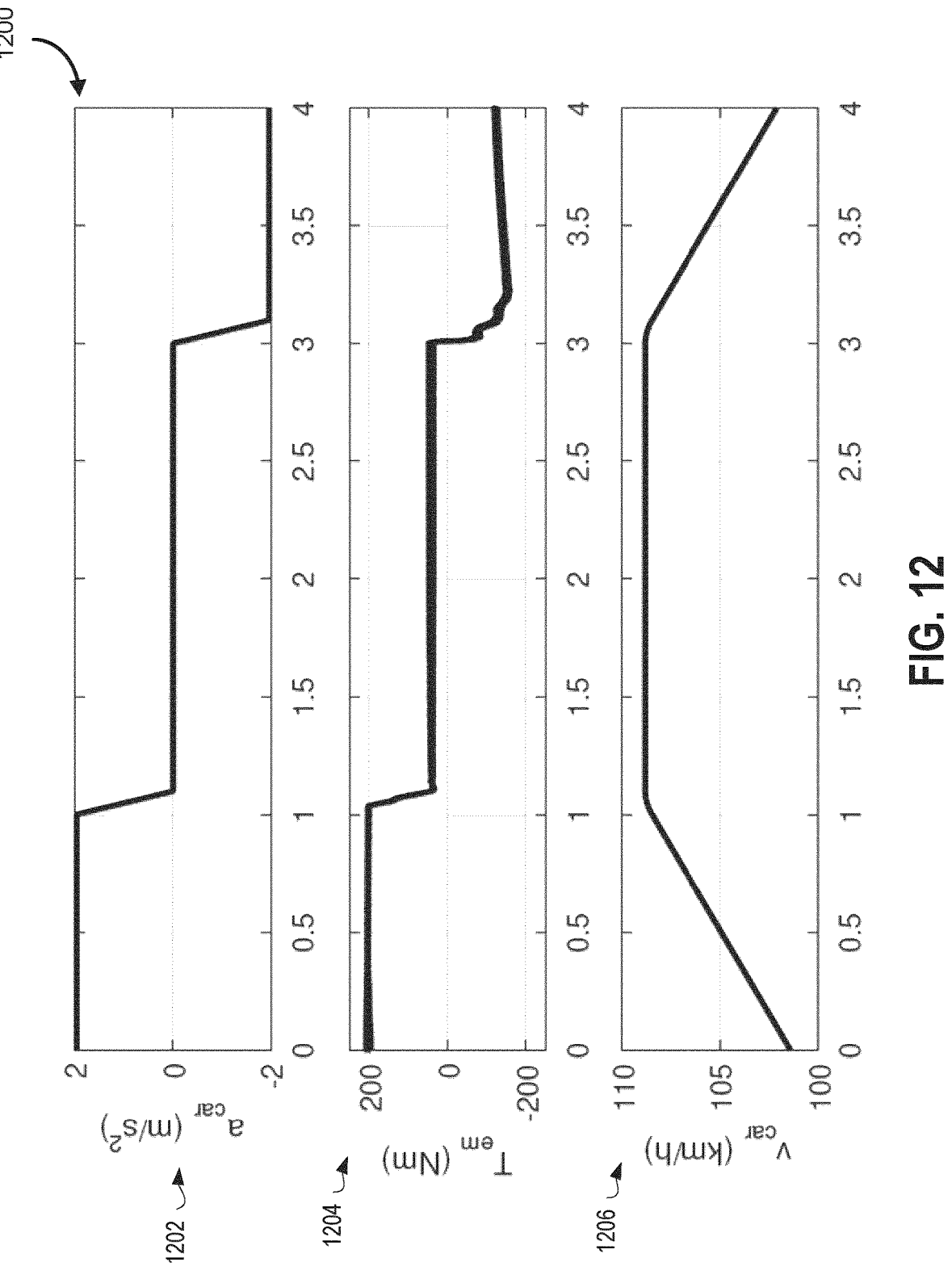
FIG. 12 shows graphs illustrative of simulation results, according to some embodiments.

FIG. 12 shows graphs 1202, 1204, and 1206 illustrative of simulation results, according to some embodiments. Graph 1202 shows the model vehicle acceleration used in the simulation, and graph 1204 shows the electromagnetic torque generated by the simulation dual inverter drivetrain 200, and graph 1206 shows the resulting EV speed.

Figure 13A:
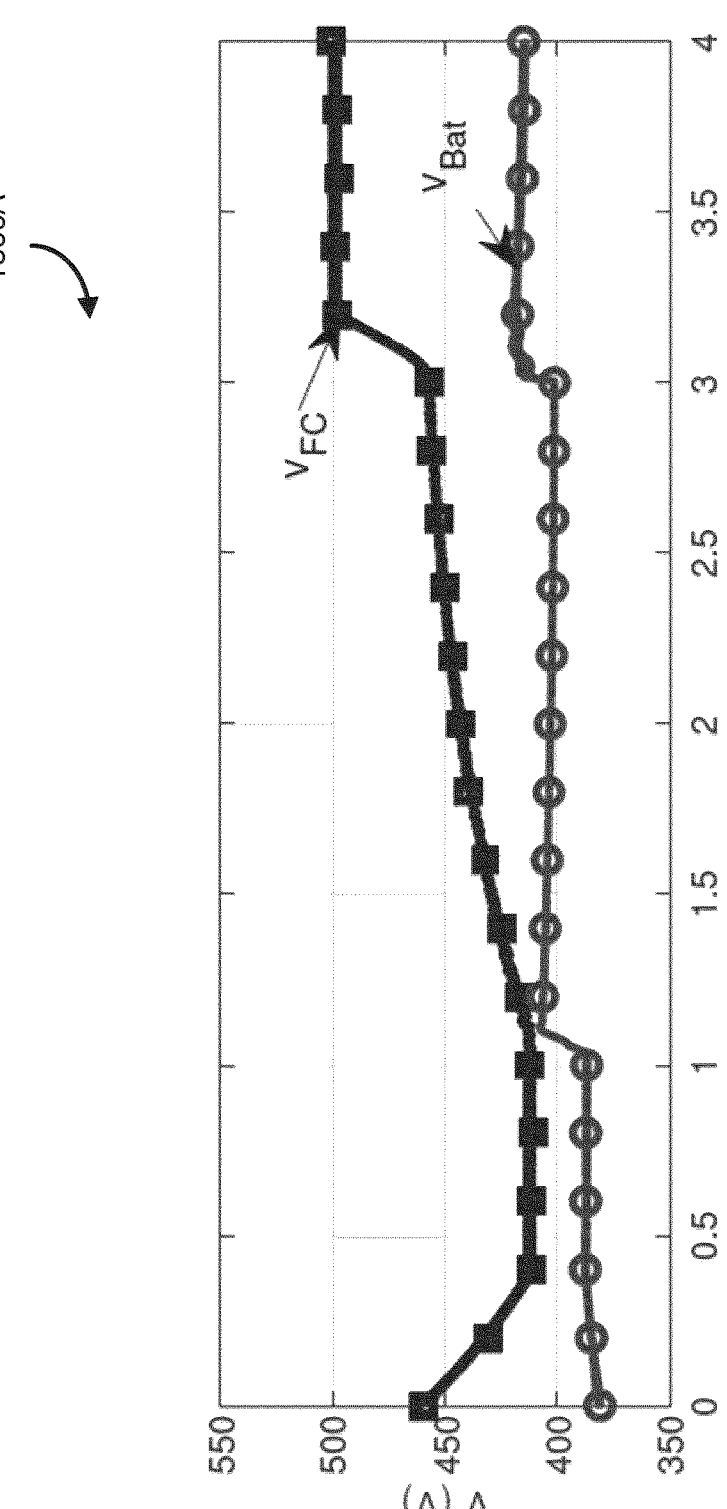
FIGS. 13A to 13B each show a graph, illustrative of simulation results, according to some embodiments.
Figure 13B:
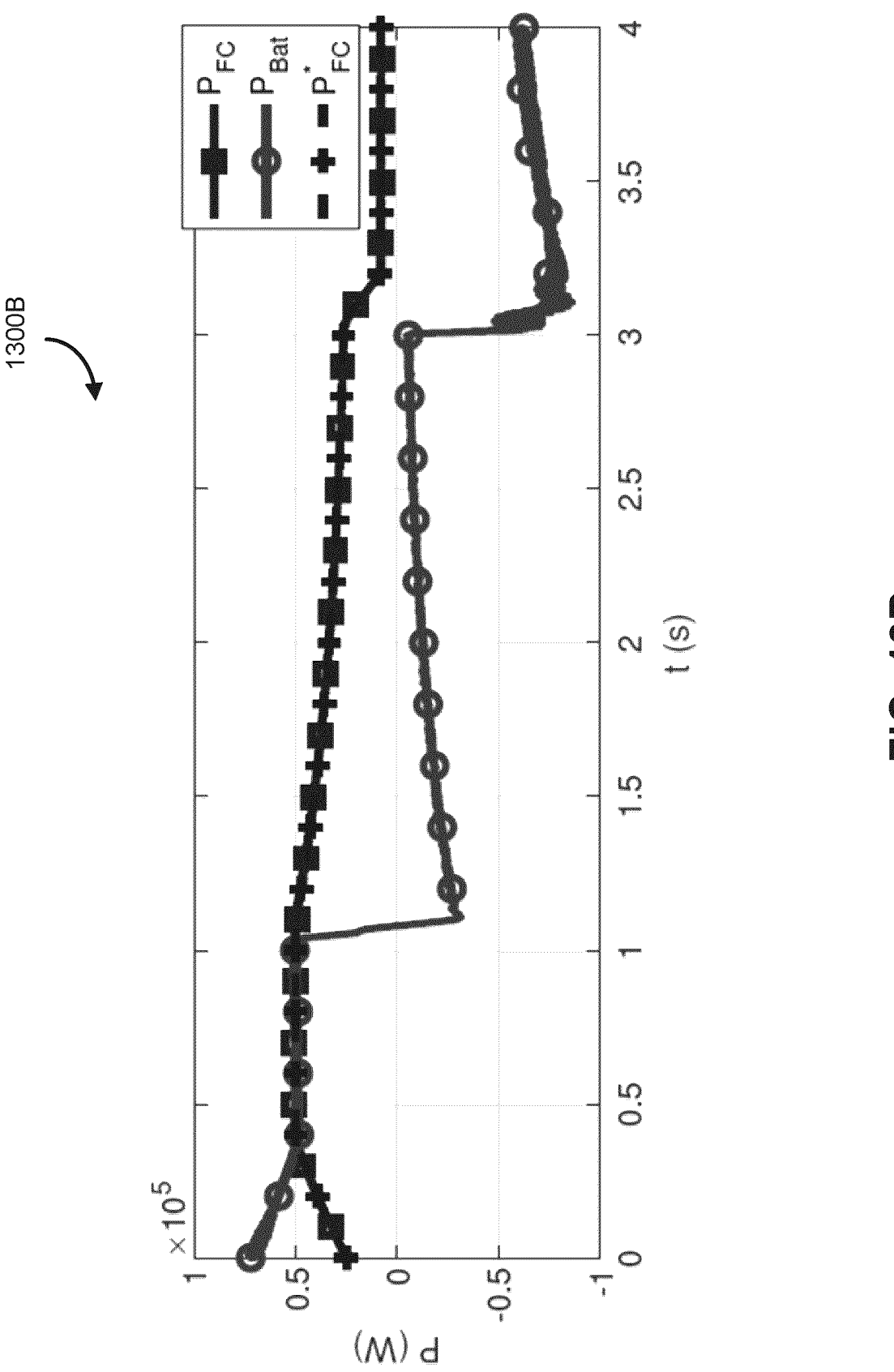

FIGS. 13A to 13B show graphs 1300A, and 1300B, respectively, illustrative of simulation results of the simulation dual inverter drivetrain 200, according to some embodiments.

Graph 1300A shows the lithium ion battery 210 and FC 208 voltages (respectively shown as $v_{BAT}$ and $v_{FC}$) throughout the simulation. The FC 208 voltage varies with a slow rate (e.g., gradual, changes in seconds) of change throughout the simulation. In contrast, the battery 210 voltage exhibits higher rates of change (e.g., faster, in milliseconds) around t=1 s and t=3 s, which correspond to the changes in the acceleration profile shown in graph 1200. The reason for this can be understood by observing graph 1300B, which shows the battery 210 power, FC 208 power, and FC 208 power reference (shows as, respectively, $P_{BAT}$, $P_{FC}$, and $P^*_{FC}$). The FC 208 power tracks the slowly changing FC 208 power reference, which was generated using the control apparatus shown in FIG. 11, which utilizes a low pass filter (with a time constant of 1 s, as shown in Table 2). In contrast, the battery 210 power changes rapidly around the times of 1 s and 3 s, which is what enables the electromagnetic torque profile shown in graph 1204 to have fast transients.

In the period following 3 s, a positive FC 208 power is maintained despite the electromagnetic torque of the motor 206 (shown in graph 1204) becoming negative, which means that the motor 206 power is negative, since the EV speed is still greater than zero.

Figure 14:
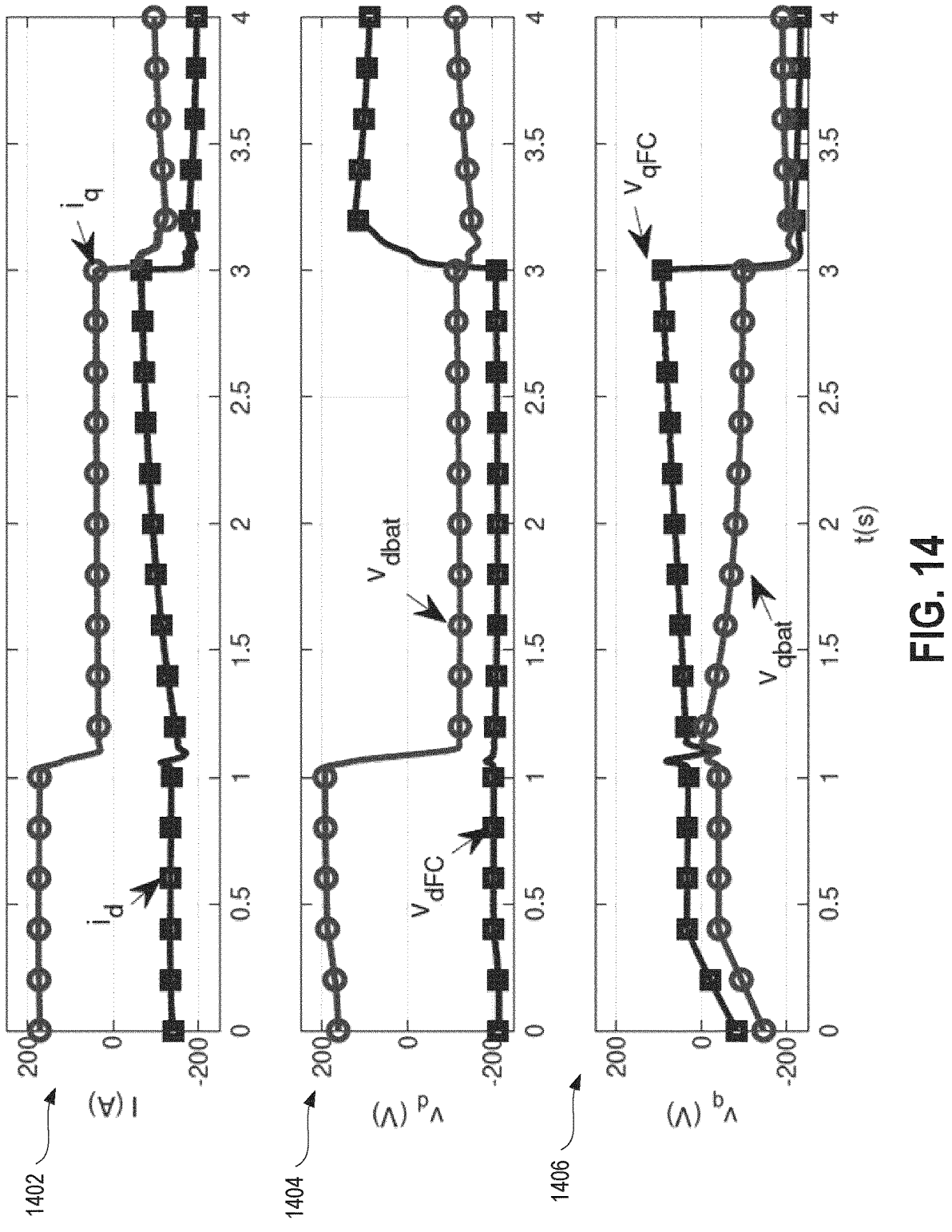
FIG. 14 shows graphs illustrative of simulation results in rotating reference planes, according to some embodiments.

FIG. 14 shows graphs 1402, 1404, and 1406 illustrative of simulation results in rotating reference planes, according to some embodiments. The simulated dq frame currents of the motor 206 are shown in graph 1402, along with the dq voltages produced by the battery inverter 204 and fuel cell inverter 202, where graph 1404 shows the FC and battery d axis voltages, while graph 1406 shows fuel cell and battery q axis voltages.

In this example shown in FIG. 14, the combination of battery voltage and motor operating speed is high enough for field weakening to be required.

An example of such speed would be during highway or freeway operation.

During the acceleration (0 s to 1 s) and the deceleration (3 s to 4 s) periods, a significant portion of d-axis current is requested, as the motor 206 is within the field weakening region. During the cruising period, field weakening is not required, so the d-axis current gradually reduces as the power sharing control approach slowly reduces the flux-producing current requirements to ensure that the fuel cell power reduces with a rate of change specified by its reference. The split of the dq battery and fuel cell voltages is achieved according to the methodology shown in 800 and ensures that the power requirements of both the drive and fuel cell are adhered to.

Figure 17:
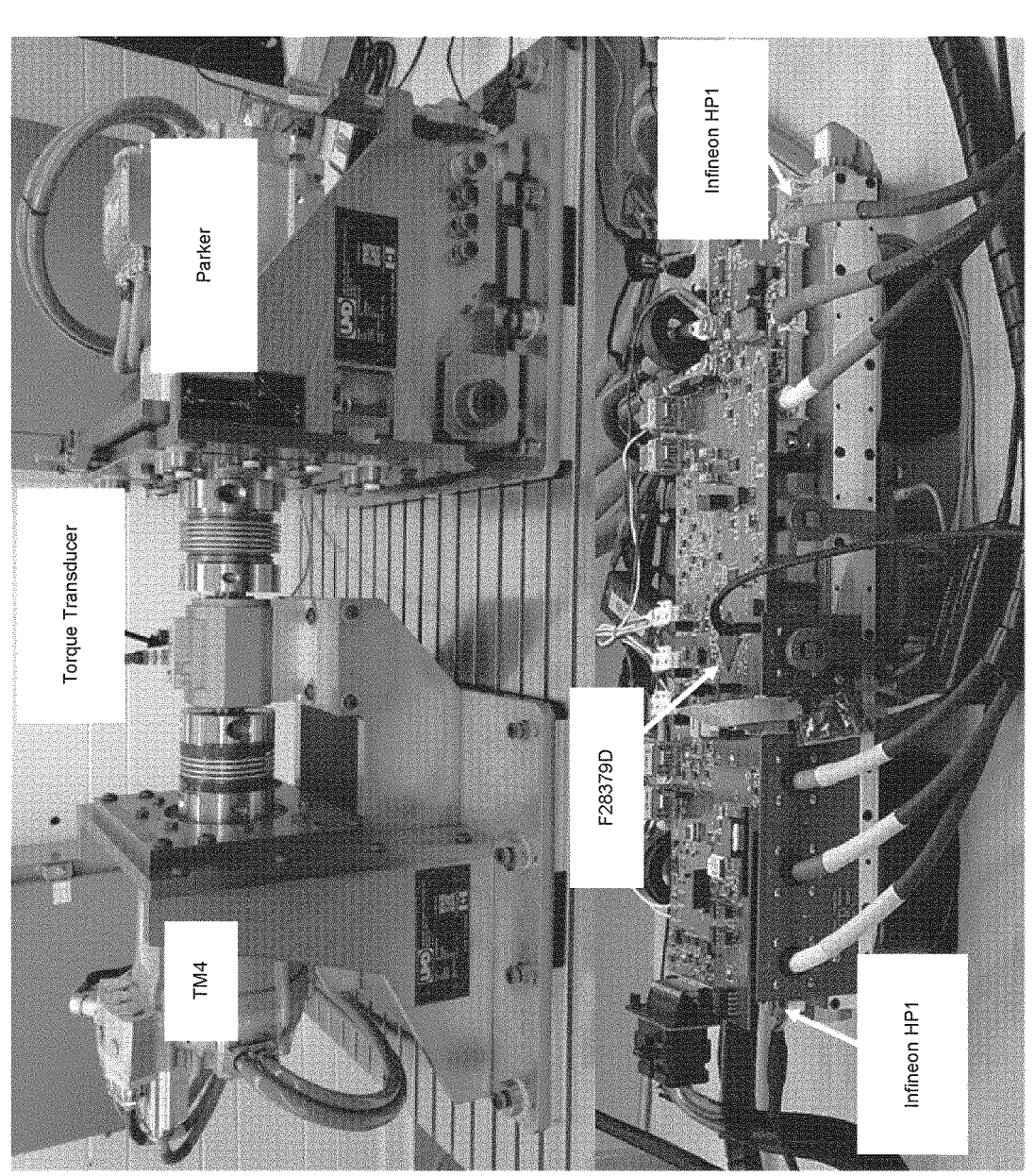
FIG. 17 is a block schematic of an experimental setup.

FIG. 17 shows the experimental setup.

The top portion is a picture of the dynamometer system that emulates the EV's traction motor, which is used to test different driving results/states. The dynamometer system contains a resolver (position sensor) which feeds information to the controller. There is an additional sensor on the torque transducer to monitor the torque and speed of the motor during testing.

The bottom portion of FIG. 17 is a picture of the power electronic converter, which contain current and voltage sensors connected to a controller (e.g., a TI F28379D) that makes decisions based on the current or voltage signal proportional to a measured current or voltage. Various embodiments may be implemented to the power electronic converter.

The power electronic converter couples electrically to the TM4 of the dynamometer system (through the six Infineon HP1 connections), to two bi-directional voltage sources (not shown in the picture), to one bidirectional voltage source to emulate a battery, and to another bidirectional voltage source to emulate a fuel cell.

Figure 18:
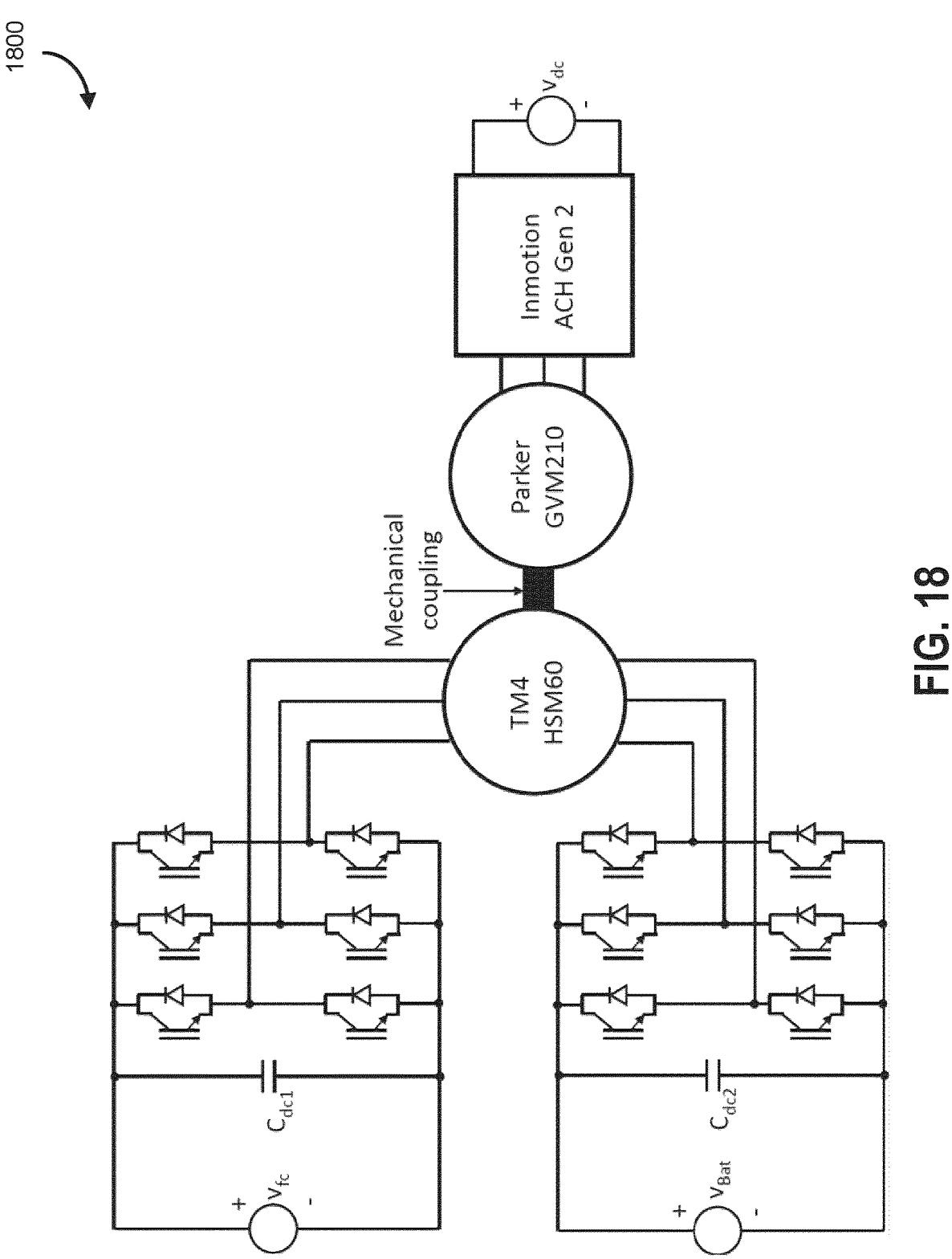
FIG. 18 is a circuit schematic diagram illustrative of the dynamometer system and power electronic converter of FIG. 17, according to some embodiments.

FIG. 18 is a circuit schematic diagram of the experimental setup of FIG. 17. The six wires correspond to the Infineon HP1 connections found in FIG. 17. The addition of the Inmotion ACH Gen2 inverter (not shown in FIG. 17) is used to effectively emulate the traction load that a vehicle would experience.

Figure 19:
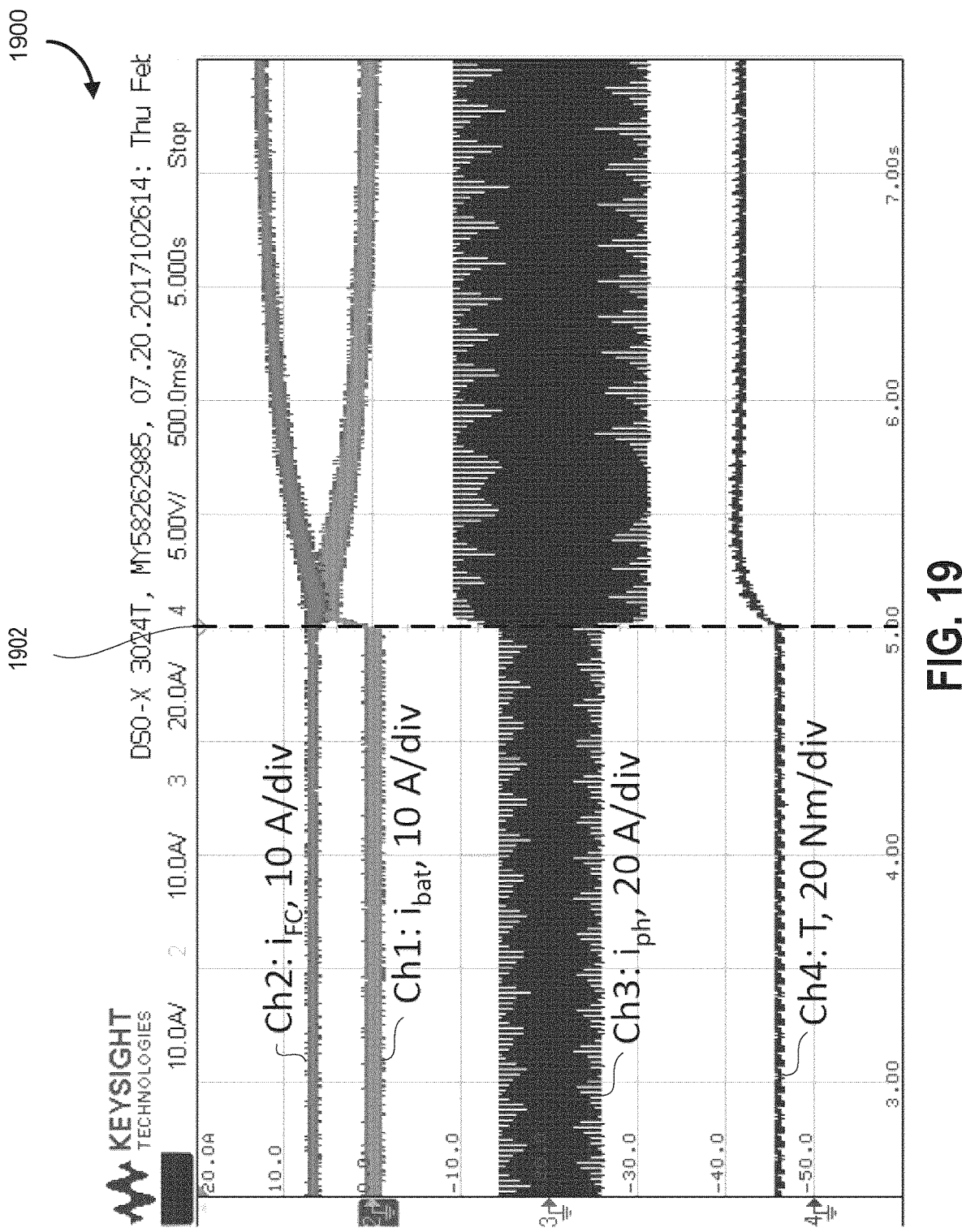
FIG. 19 is a graph containing a set of electrical traces showing a step change increase in the generator torque, according to some embodiments.

FIG. 19 shows a set of electrical traces during a commanded step change increase in generator torque, indicated by the dotted line 1902 from approximately 10 Nm to approximately 20 Nm (approximate due to the control of the current of the motor and not the torque itself in the experimental setup—9-18 Nm are also possible).

Channels 1 and 2 show the battery current and FC current, respectively. Channel 3 corresponds to a current from one of the motor phases, which increases along with the torque, shown at channel 4. The steady electrical traces of channels 1 and 2 prior to the torque increase shows a constant voltage from the battery and FC, which is proportional to the actual power. As the torque increases, the battery power increases rapidly while the FC power increases slowly. It can be observed that even though the torque has a fast response, it reaches the new set point in less than 500 ms.

Observing channel 3, showing the current from one of the motor phases, so the observation that that steps up extremely rapidly at the same time that torque steps up indicates that the system is increasing torque rapidly, showing that there is fast torque control of the motor and that the approach can control the vehicle dynamically, while having slow control of the FC. It is important to recall that the FC can never absorb power—even during generation, etc., and that is why a FC only car would be difficult to implement because there is nowhere to send that energy (e.g., if one sends energy to FC, it will be damaged, and this could potentially be hazardous leading to a loss of the device). If a FC is damaged, it may not be usable after that point—and in some applications, designers simply adapt the system to burn the energy instead (e.g., using a "braking resistor" to burn the energy). The approach aids in enhancing safety to ensure that the operating conditions are maintained within operating bounds of the fuel cell.

In the experiments, the approach to emulate the FC reference is by making that power reference be a low pass filter of the mechanical reference of the vehicle to be used as a reference analog. In a practical implementation, rather than an emulation, the FC reference can be obtained based the FC itself (e.g., onboard monitoring device), or a command from a vehicle control unit (e.g., VCU/ECU).

Figure 20:
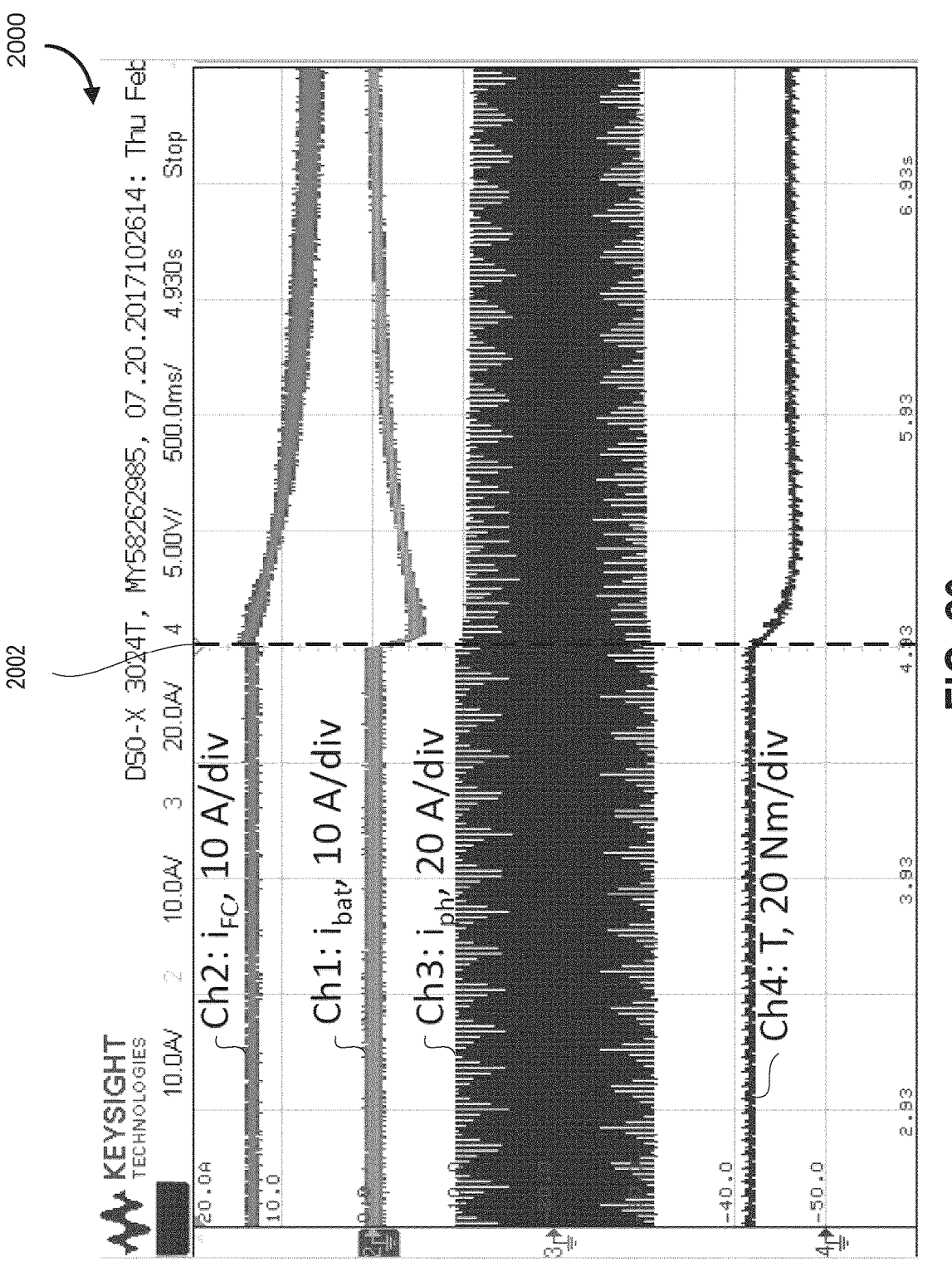
FIG. 20 is a graph containing a set of electrical traces showing a step change decrease in the generator torque, according to some embodiments.

FIG. 20 shows a similar set of electrical traces except during a commanded step change decrease in the generator torque, indicated by the dotted line 2002. The FC's current, shown at channel 2, ramps down slowly compared to the battery's current, shown at channel 1. The motor's current (channel 3) does not have a step change in this graph compared to the torque increase in FIG. 19. Instead, the motor's current ramps down gradually due to an additional reactive component which is included to ensure a certain amount of FC power is available.

In FIG. 20, the additional reactive component relates to the injected component that is optional in some embodiments, but is useful for ensuring that the FC power can be reduced in a controlled way. If there is no reactive component, instead of a smooth ramp down, there would be a much faster drop. The reactive component allows for the reduction of stepwise decreases.

The maximum power that the FC can produce is limited by how large the channel 3 trace is. Right after the torque transient, —if the channel 3 trace has a step down, similar the previous image had a step up, at that instant when it happens, there is a limitation on max FC power that can be provided.

On the other hand, the additional reactive component is not needed when increasing speed, because the channel 3 trace is increasing, and the system is increasing the limit of FC power. Even with higher limit, the approach can use controls to control such that it is not immediately reached. However, when in a reduction, if no steps are taken to add to the trace of channel 3, operation limits could be reached basically are at the limit and there could be performance reductions.

Figure 21:
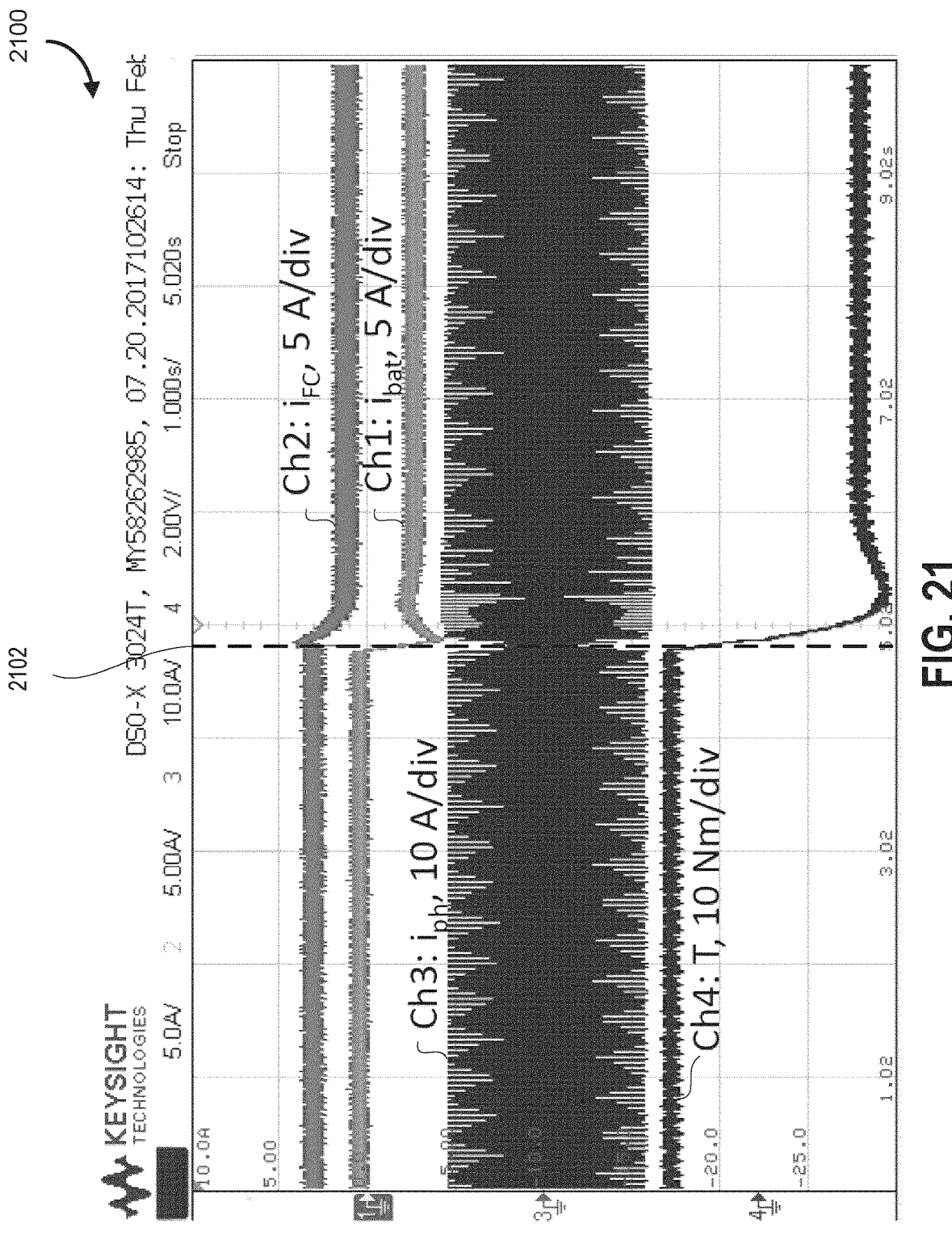
FIG. 21 is a graph containing a set of electrical traces showing the transition of the motor from motoring to regenerating with only the FC and no battery, according to some embodiments.

FIG. 21 contains another set of electrical traces showing the motor transitioning from motoring to regenerating, which effectively mimics the action of braking. The dotted line 2102 is placed at the midpoint of channel 4, which separates the phase of motoring (before midpoint) and regenerating (after midpoint). Even with the braking transient, the current of the FC stays positive (channel 2) while the current of the battery goes negative (channel 1). This indicates that while the battery is regenerating, the FC continues to supply power out.

The small jump in the FC current prior to the transition may be due to non-idealities or control parameters, but can be considered negligible.

Figure 22:
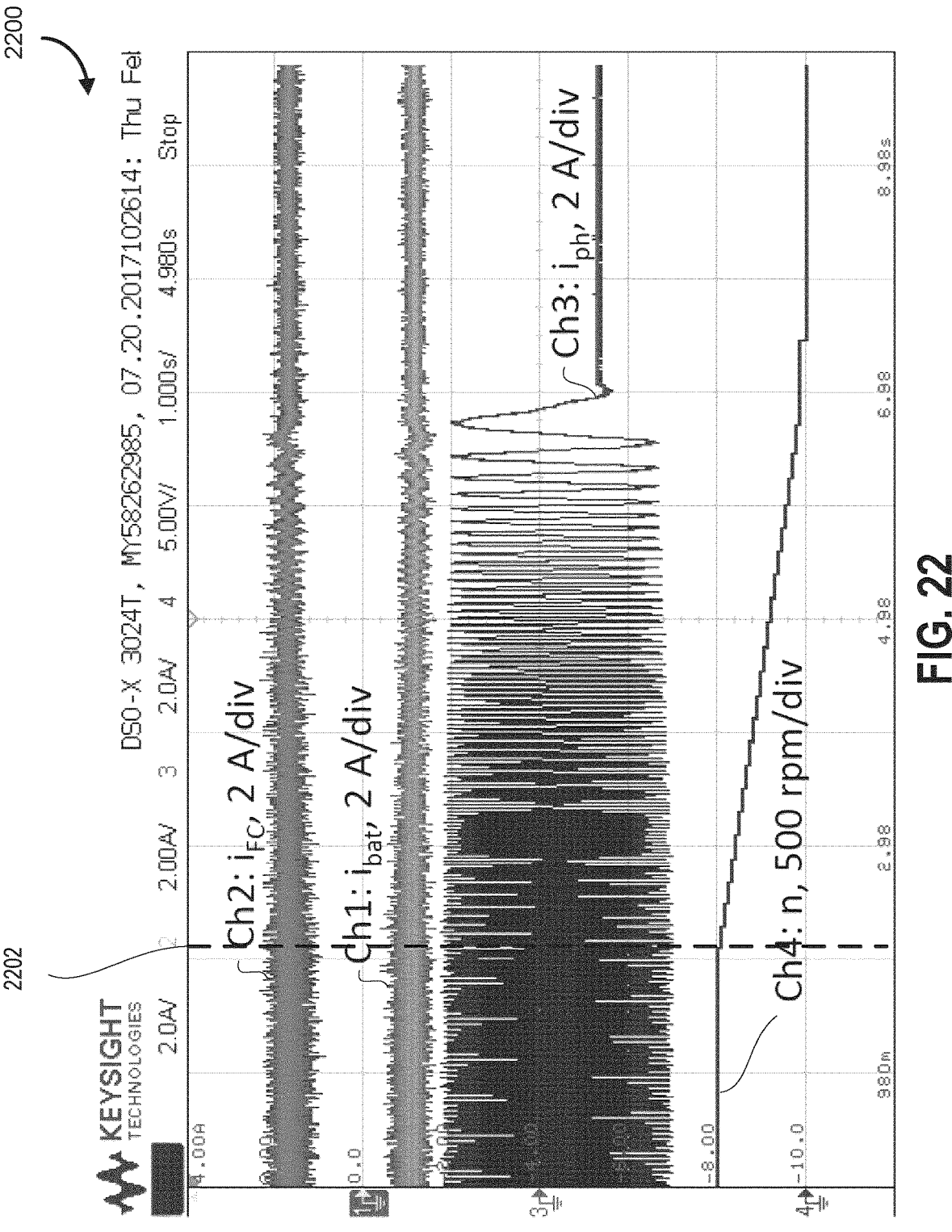
FIG. 22 is a graph containing a set of electrical traces showing system power delivery while decreasing speed to the point of standstill, according to some embodiments.

FIG. 22 shows a set of electrical traces corresponding to a decrease in system power delivery until the point of standstill. The speed of the motor is represented by channel 4 and is measured by a torque transducer. As the motor frequency decreases, the FC current remains positive and the magnitude of the current does not greatly change (channel 2). During the decrease, the battery is absorbing some of the power from the FC (channel 1).

Figure 23:
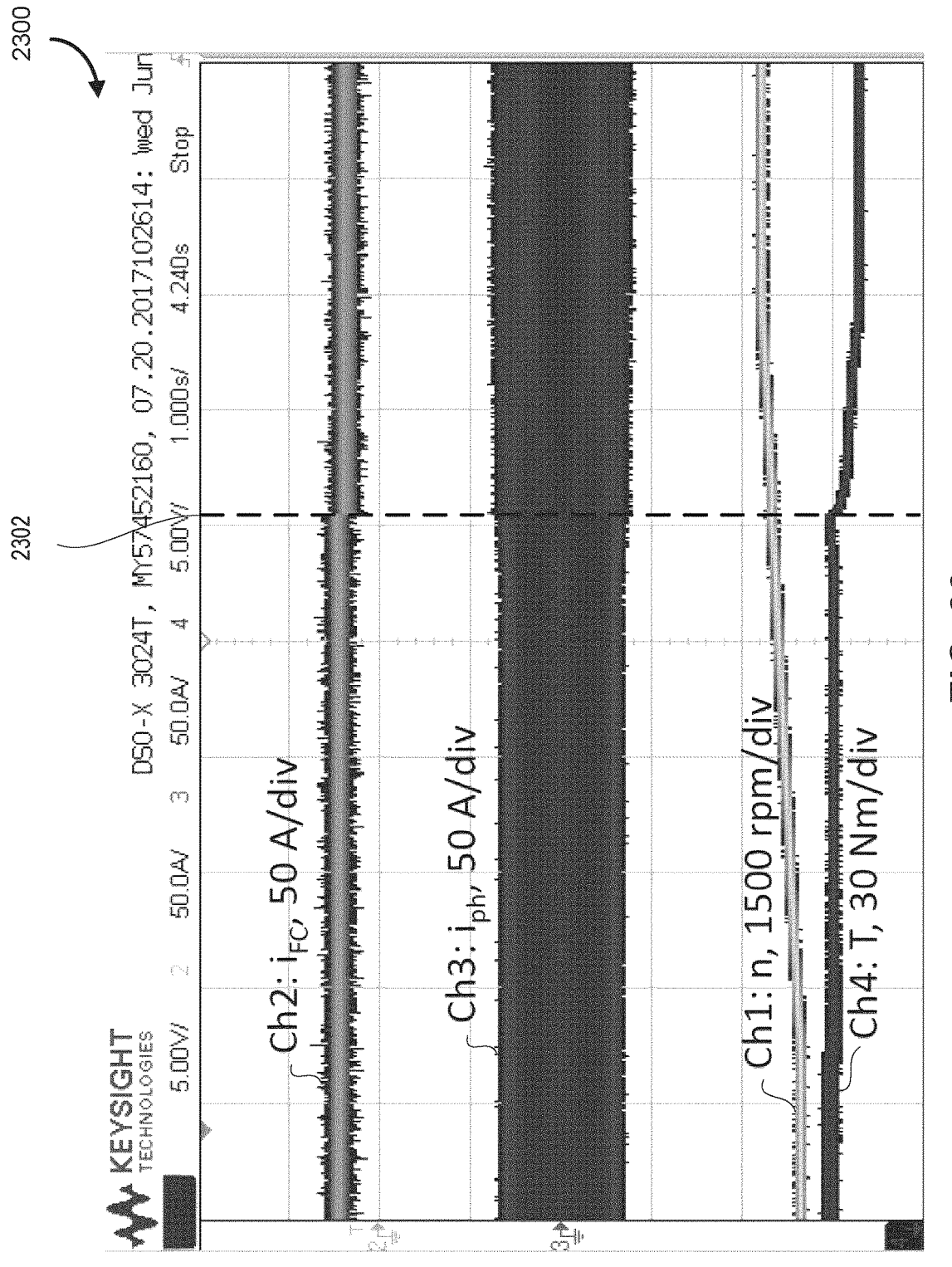
FIG. 23 is a graph containing a set of electrical traces during operation at higher speeds, according to some embodiments.

FIG. 23 contains a set of electrical traces during operation at high speeds (2000 to 2650 RPM). At high speeds, the motor is requesting more voltage than the battery is able to provide. The electrical trace of channel 2 shows that the FC can effectively hold its power with minimal change. By ramping down the torque being produced from the motor, higher speeds can be reached while respecting the FC power reference.

Experimental Results

The proposed algorithm was validated on the experimental setup shown in FIG. 17. The TM4 HSM60 motor described in Table 2 was used as the open-wound PMSM, which was coupled mechanically to a Parker GVM210 motor which acted as a load machine. The TM4 motor was controlled by a dual-inverter prototype constructed from two Infineon Hybridpack 1 three-phase traction modules. The power sharing mechanism was implemented on a Texas Instruments™ F28379D microcontroller. The Parker™ machine was controlled by an Inmotion™ ACH Gen2 inverter, which was configured to operate in speed control mode. FIG. 18 shows an electrical circuit diagram of the experimental setup. While this setup was used for experimentation, Applicant notes that there are other possible approaches.

The DC voltage sources $v_{FC}$ and $v_{Bat}$ shown in FIG. 18 were implemented by bidirectional DC power supplies. The value of $v_{FC}$ was set to a constant 150 V, while the value of $v_{Bat}$ was set to 200 V for the experiments. The remaining experimental parameters are shown in Table 3:

| Parameter | Description | Value |
|---|---|---|
| $v_{FC}$ | Fuel cell voltage | 150 V |
| $v_{Bat}$ | Battery voltage | 200 V |
| $v_{dc}$ | Load inverter DC voltage | 300 V |
| $C_{dc1}$, $C_{dc2}$ | DC link capacitance | 500 µF |
| $P_{FCmin}$ | Minimum fuel cell power | 250 W |
| $\tau_{FC}$ | FC controller time constant | 1 s |
| $f_{sw}$ | Switching frequency | 10 kHz |

Torque Transients at Constant Speed

In this section, the dynamometer (Parker) motor was operated in speed control with a fixed reference of 1000 rpm. In the first experiment, a step in torque reference from 10 Nm to 20 Nm was conducted for the TM4 motor at this speed. FIG. 19 shows the results of this experiment, where the torque transient occurs five seconds into the record. Channel 1 is the current of the FC (150 V source), channel 2 is the current of the battery (200 V source), channel 3 is the phase A current of the TM4 motor and channel 4 is the shaft torque of the experimental system measured by a torque transducer. Prior to the torque step, the FC has a current of 7 A (corresponding to $P_{FC}$=1050 W) whilst the battery has a current of 0 A (indicating the FC supplies all mechanical power).

After the torque step occurs at a time of 5 seconds, the battery current rapidly rises to a peak value of 6.5 A, indicating a peak transient power of 1300 W being delivered from the battery. In contrast, the FC current slowly ramps up (due to the $T_{FC}$ value of 1 s) reaching a maximum value of 13.5 A five seconds after the torque transient (corresponding to a FC power of 2025 W). The battery current decays towards zero by this time, indicating that all steady-state power is supplied by the FC. During this operation, the power factor control is utilized to control the angle between the motor current and fuel cell voltage vectors as described in embodiments above.

The motor current had a step up, and as a control approach to cause a slow power change, the approach includes opening up with a larger angle at the instant it moves up, and slowly move it back to the current steady state power once enough time had elapsed for the fuel cell to reach its steady state value. This is so that the system does not change power too quickly.

Where the approach includes stepping down motor power, an objective would be to keep the FC power higher for longer and then slowly ramp it down, in those cases, the angle would be set to 0—let's say even at 0 angle, the system is still not able to produce enough power, and in a variant embodiment, the system is controlled to inject the reactive current to meet our slowly reducing power reference.

For example, in this embodiment, the angle is detected to drop to 0, that's when the system switches mode to an injection mode. Once the system reaches steady state, it will arrive to a steady value of gamma and stay there until something changes—acceleration or deceleration, and that is when gamma would change again.

At the time of the torque transient, the TM4 motor phase A current (channel 3) observes a step increase in magnitude. The slow increase in FC current despite this transient indicates that the correct angle $\gamma$ between the FC voltage and stator current vectors is being calculated.

The second experiment in this section involved a step reduction in torque from 20 Nm to 10 Nm at a speed of 1000 rpm. Prior to the transition, the FC current is at 13.5 A (corresponding to 2025 W) while the battery current is 0 A (indicating no power transferred from the battery). Shortly after the torque transient, the battery current reaches a minimum value of −5 A (meaning that a transient power of 1 kW is absorbed by the battery). This transient power is the difference between the required electrical power by the motor (which changes rapidly according to the torque transient) and the slowly changing FC power. The FC current declines slowly after the transient, eventually reaching a value of 6.5 A at the end of the record, indicating that 1300 W is transferred by the FC. By this time the battery current has increased to 0 A indicating that no power is being absorbed by the battery at this stage.

In contrast to FIG. 19 the phase current shown in FIG. 20 does not exhibit a step change at the time of the torque transient. Instead, the phase current slowly ramps down in magnitude due to the injection of power sharing current to ensure that the FC can maintain its power reference despite the fast reduction in mechanical power which is requested.

Regeneration

In this experiment (FIG. 21) a torque transient from 10 Nm to −10 Nm was delivered by the TM4 motor at a rotational speed of 500 rpm. Due to the positive value of rotational speed, a negative torque value indicates that regenerative energy is being recovered from the drive, which can only be absorbed by the battery.

Prior to the transient, the FC current was equal to 3.2 A (indicating 480 W transferred from the FC) while the battery current was 0 A (no power from battery. After the torque transient, the FC current slowly declines to 1.4 A where it is maintained. During the transient the battery current declines to a minimum value of −4 A (indicating 800 W of recovered power to the battery) before reaching −2.7 A in steady state (540 W delivered to battery). This battery power is equal to the electrical power generated by the TM4 motor added to the $P_{FCmin}$ produced by the FC. FIG. 21 clearly validates that the proposed algorithm is capable of achieving regenerative braking whilst ensuring that only positive power is delivered by the FC, a critical requirement for deployment of this topology in EV drives.

Power Transfer at Standstill

For the next experiment, a ramped down speed reference from 500 rpm to 0 rpm was commanded for the Parker dyno whilst the TM4 machine was operated with zero torque reference and a 250 W minimum FC power reference. The FC current has a constant value of 1.7 A throughout the transient, indicating 255 W was delivered from the FC throughout the entire interval. The battery current was −1 A indicating that 200 W was absorbed by the battery throughout this process. The reduction in speed is clearly visible from the phase A current waveform (FIG. 22) which exhibits a reduction in frequency as speed is reduced. This current is non-zero despite the zero torque being requested from the TM4 motor due to the FC power. At zero speed, a DC phase current is visible. This result shows that the proposed algorithm can ensure that the power transfer requirements of the FC can be achieved across variable speeds and at standstill.

Field Weakening

In the final experiment, the system was initially operating with a load torque of 30 Nm at a cruising speed of 2000 rpm. The maximum FC power specified by the saturation block in FIG. 23 was 3.3 kW, and as such the FC current had a value of 22 A. This limitation in maximum FC power is needed in order to observe the reactive current injection due to field weakening, as a higher fuel cell power reference would result in power sharing reactive current being injected. At an experimental time of one second, the speed reference of the load motor is increased to 2650 rpm. The shaft speed (channel 1) is seen to rise accordingly, while the FC current (and hence power) remains constant.

As the system speed reaches a value of approximately 2300 rpm (at an experimental time of six seconds), field weakening operation occurs as can be seen by the reduction in torque which begins at this time. This reduction continues until the load motor reaches its reference speed of 2650 rpm and stabilizes at a final value of 21 Nm. This result verifies the performance of the field weakening algorithm proposed in section V.

Analytical Loss Comparison

In this section, an analytical comparison is made of the power electronic and motor losses anticipated for the existing fuel cell integration shown in FIG. 1B and the dual inverter drivetrain 200 shown in FIG. 2. In this study, the same fuel cell parameters as provided in Table 1 were used, while the motor and vehicular parameters provided in Table 2 were utilized. The switching frequency and battery voltage for the dual inverter case are also provided in Table 2 (10 kHz and 400 V, respectively).

The circuit parameters used for the conventional case are shown in Table 4:

| Parameter | Description | Value |
|---|---|---|
| $V_{batC}$ | Nominal battery voltage | 800 V |
| $f_{swI}$ | Traction inverter switching frequency | 20 kHz |
| $f_{swB}$ | Boost converter switching frequency | 20 kHz |
| $L_B$ | Boost converter inductance | 0.3 mH |
| $R_B$ | Boost converter inductor ESR | 1.2 mΩ |

23

24

It should be noted that a higher battery voltage of 800 V is used. This may provide a more accurate comparison between the dual inverter and boosted system, since the dual inverter is capable of forming a motor voltage vector that is a composite of the voltage vector from each inverter (as was shown in 500). An additional difference is that the switching frequency of the traction inverter is set to 20 kHz, compared to the 10 kHz of the dual inverter drivetrain 200. The dual inverter drivetrain 200 is capable of producing a multilevel voltage waveform. This ability allows the dual inverter drivetrain 200 to be switched at a lower frequency while maintaining a similar motor current ripple profile compared to the existing fuel cell integration. Lastly, the boost inductor value and parameters for the existing fuel cell integration case were obtained in order to achieve a 10% fuel cell current ripple at a boost converter switching frequency of 20 kHz.

The parameters of the power electronic components used in the dual inverter and boosted cases are shown in Table 5:

In example embodiments, the energy efficiency of the conventional and dual inverter drivetrain 200 over a drive cycle can be modelled by:

$$\eta_E = \frac{\int p_{out}(t)dt}{\int p_{out}(t)dt + \int p_{loss}(t)dt} \tag{46}$$

where $p_{loss}$ is the power loss of the drivetrain, and $p_{out}$ is the output power of the drivetrain, which is measured either at the motor shaft for motoring operation and at the battery for regeneration.

Figure 15A:
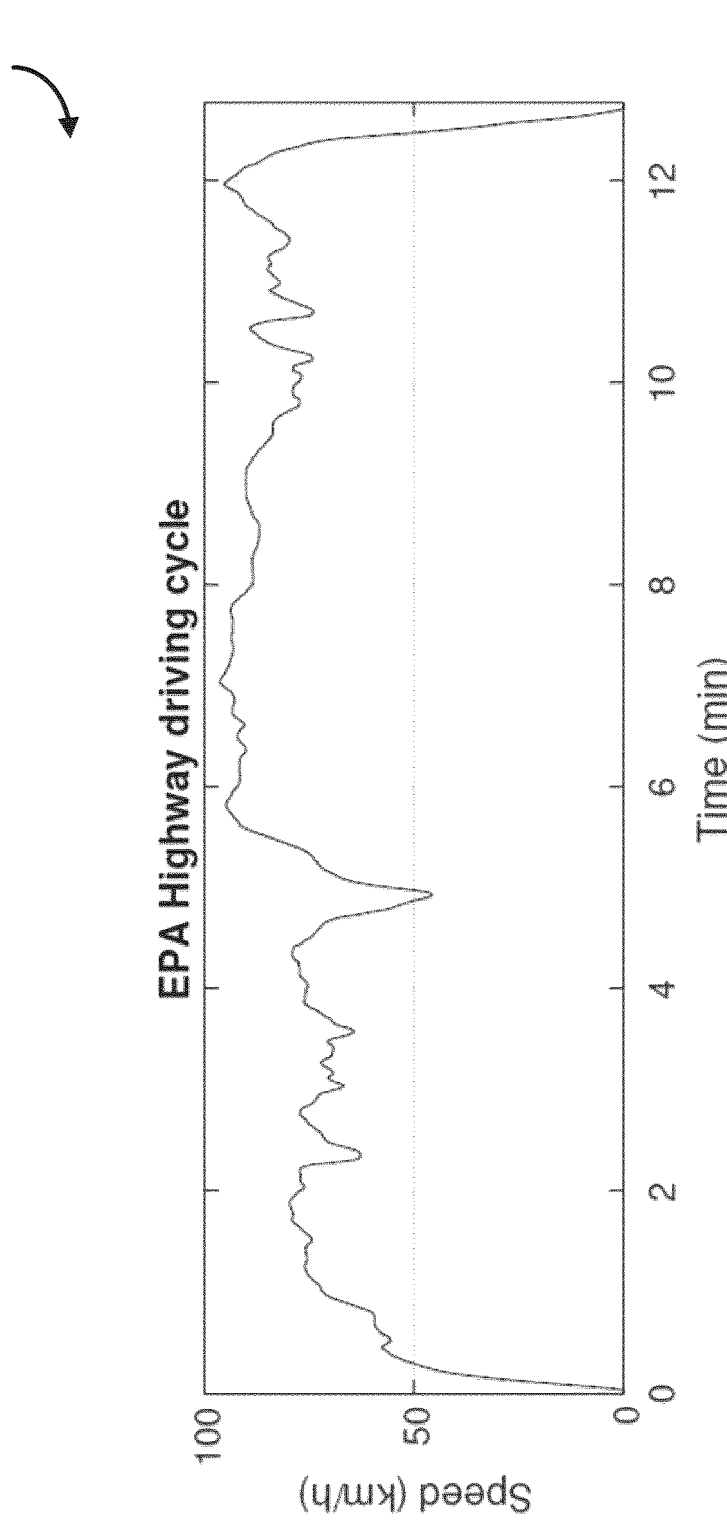
FIGS. 15A to 15B are, respectively, a graph of driving cycle and graph of a comparison of losses of the driving cycle of FIG. 15A, according to some embodiments.
Figure 15B:
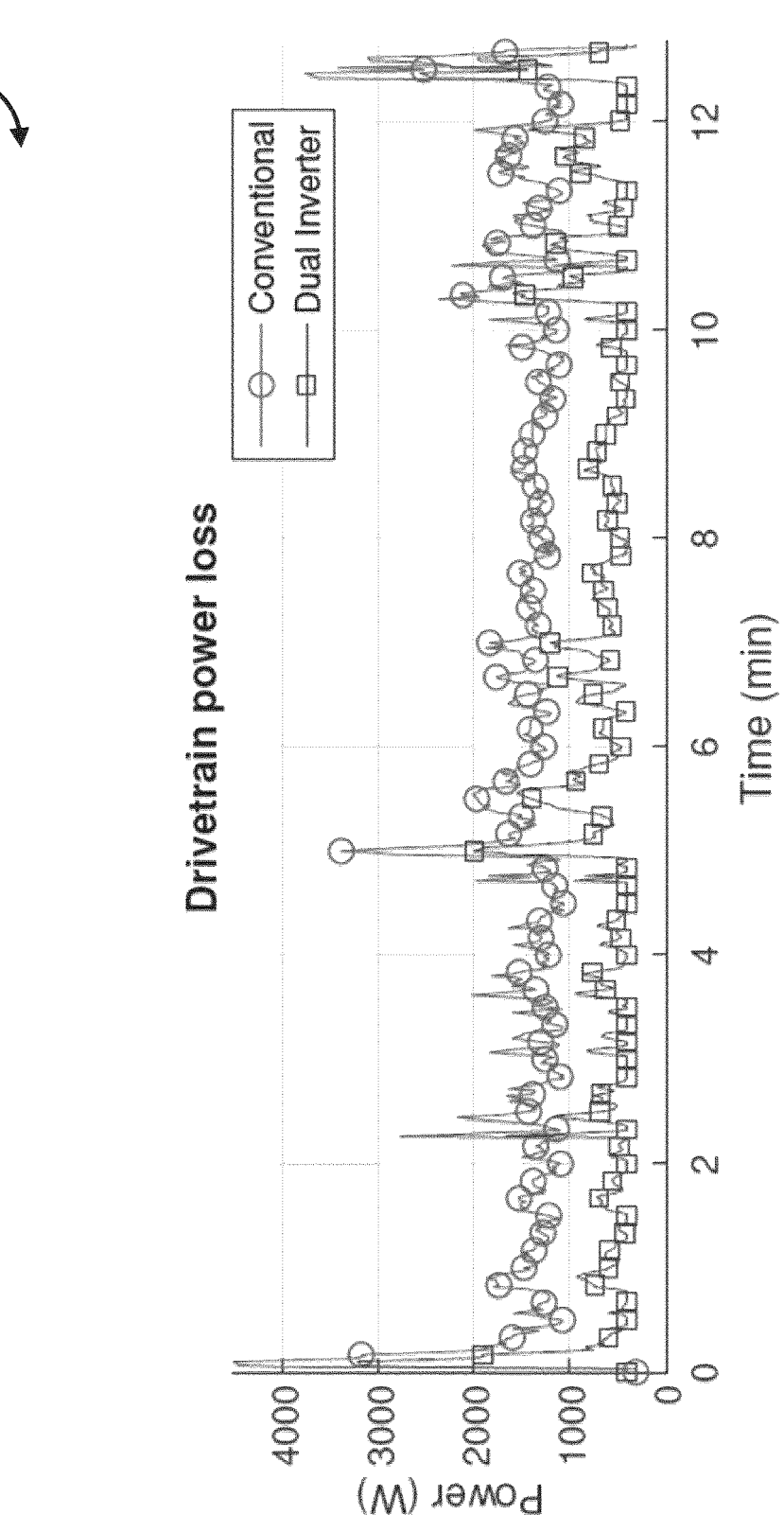

The energy efficiency for both drive cycles shown in FIGS. 15A and 15B is summarized in Table 6 below, for the dual inverter drivetrain 200 and conventional drivetrains. A 7.46% improvement in energy efficiency is obtained in the urban drive cycle, and a 5.34% improvement in the highway drive cycle.

| Parameter | Description | Dual Inverter | Conventional Inverter | Boost Converter |
|---|---|---|---|---|
| Part number | — | FS400R07A3E3H6 | FS400R12A2T4 | FS450R12KTP4 |
| $V_{ces}$ | Collector-emmiter voltage | 705 V | 1200 V | 1200 V |
| $I_n$ | Nominal current | 400 A | 300 A | 450 A |
| $V_{ceo}$ | IGBT on voltage | 0.798 V | 0.889 V | 0.78 V |
| $V_{Do}$ | Diode on voltage | 0.95 V | 0.92 V | 0.8 V |
| $R_{on}$ | IGBT on resistance | 2.2 mΩ | 3 mΩ | 2.78 mΩ |
| $R_D$ | Diode on resistance | 1.4 mΩ | 1.78 mΩ | 1.27 mΩ |
| $E_{off}$ | IGBT turn-off energy | 9.1 mJ | 13 mJ | 26 mJ |
| $E_{on}$ | IGBT turn-on energy | 5.1 mJ | 17 mJ | 19 mJ |
| $E_{rec}$ | Diiode recovery energy | 3.35 mJ | 7 mJ | 19 mJ |

The higher battery voltage needed in the boosted case necessitates the use of insulated-gate bipolar transistor (IGBT) modules with a higher blocking voltage. These modules clearly have significantly higher switching energy than the lower voltage module used in the dual inverter case.

FIGS. 15A to 15B are, respectively, a graph 1500A of driving cycle and graph 1500B of a comparison of losses of the driving cycle of FIG. 15A, according to some embodiments. Graph 1500B illustrates a comparison of the calculated losses incurred in the dual inverter drivetrain 200 and existing drivetrains over the course of an EPA highway drive cycle shown in graph 1500A. Graph 1500A shows the EPA highway driving cycle including a speed (km/h) of a vehicle at a time (min), and graph 1500B shows the drivetrain power loss (WA) as a function of time (min).

Figure 16A:
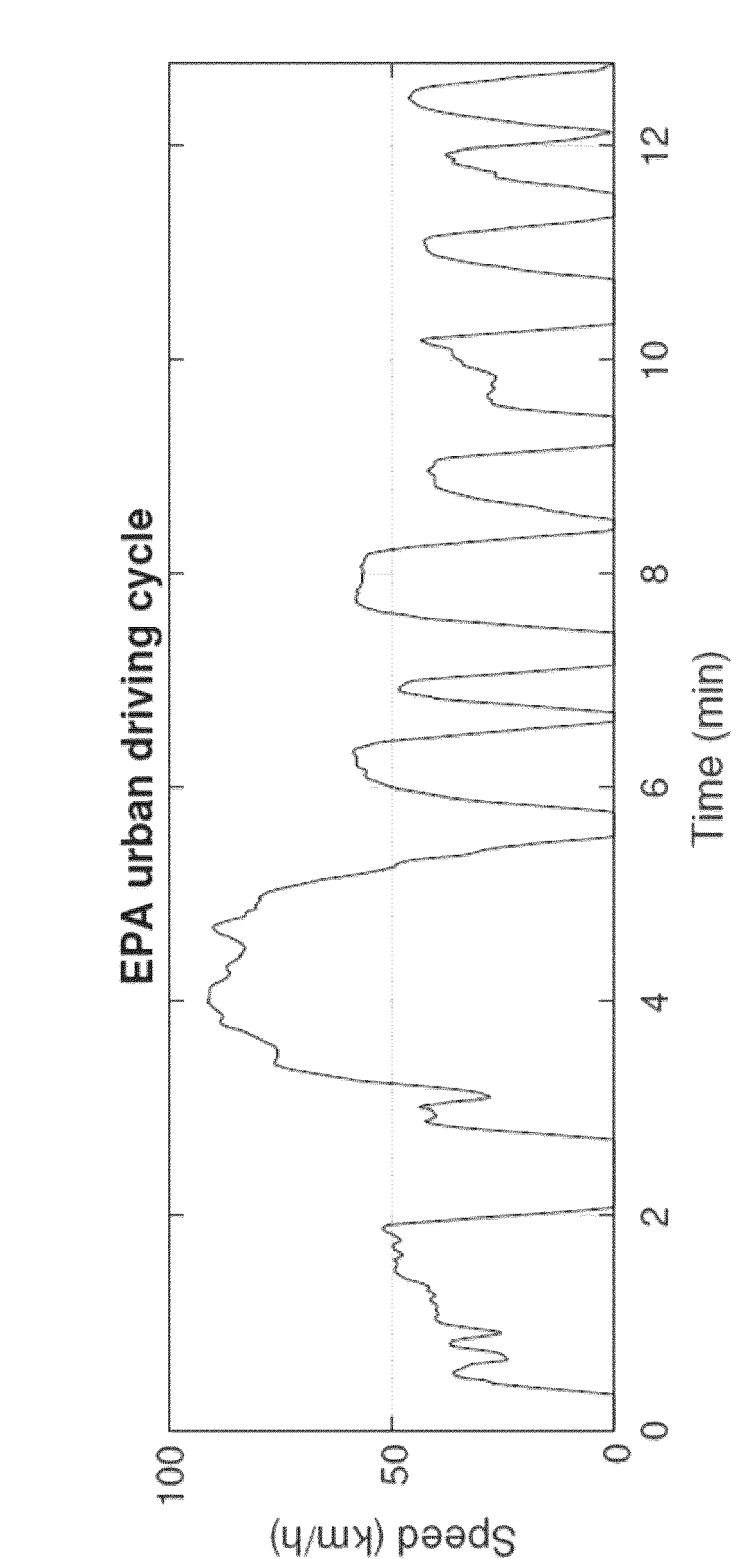
FIGS. 16A to 16B are, respectively, a graph of another driving cycle and graph of a comparison of losses of the driving cycle of FIG. 16A, according to some embodiments.
Figure 16B:
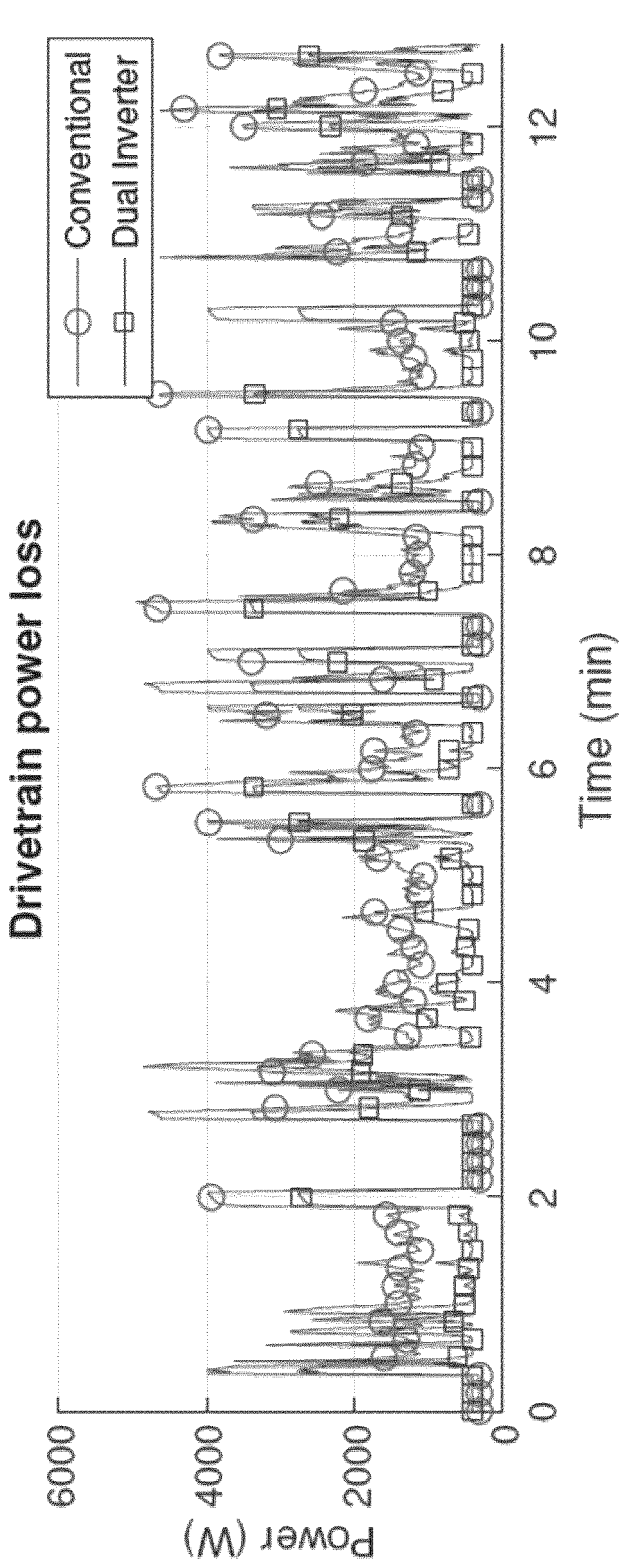

FIGS. 16A to 16B are, respectively, a graph 1600A of another driving cycle and a graph 1600B of a comparison of losses of the driving cycle of FIG. 16A, according to some embodiments. Similar to graph 1500B, graph 1600B shows a comparison of calculated losses of the conventional (boosted) and dual inverter fuel cell integration drivetrains for the EPA urban drive cycle shown in graph 1600A.

Again, graph 1600A shows the EPA urban driving cycle including a speed (km/h) of a vehicle at a time (min), and graph 1600B shows the drivetrain power loss (WA) as a function of time (min). During the simulation, the dual inverter drivetrain 200 exhibits significantly lower losses in both drive cycles.

| Drive cycle | Dual Inverter | Conventional |
|---|---|---|
| Highway | 94.15% | 88.81% |
| Urban | 78.02% | 70.56% |

Analytical comparison of drivetrain losses with the dual inverter and conventional fuel cell integration systems showed a clear improvement in energy efficiency from using the dual inverter approach.

Practical Commentary

The improvement in drive cycle efficiency would give a larger range for an electric vehicle. This is a valuable improvement for manufacturers and users. The reduction of mass due to DC-DC converter which is used in alternate approaches for FC integration allows the driving range and also improves drive cycle efficiency. Also, the reduction in volume installed on the vehicle can be used for additional cargo space, additional passenger space for improved comfort. Another benefit is that there is one less component for the electric vehicle to cool, so the cooling system has less of a load to operate.

The improvements to direct integration enables practical implementation of electric vehicles, especially during operational events where there is a swift reduction (or increase insofar as the FC power would change too fast) in required drivetrain power. Whenever there is a swift change in required driving power, this method allows us to ensure that the FC power does not change too fast.

The injection of the current as described in various embodiments herein allows one to meet the constraint of not changing too fast when there is a reduction in driving power (in typical driving where the power is positive where the motor is creating power, whereas in regenerative braking, the motor is acting as a generator and there is an absorption of power with the battery). The angle (gamma) is what allows the system to ensure that the FC power reference is met.

The operation of the two inverters is controlled, for example, using a microcontroller, such as a microprocessor or FPGA (a component that is used to control the inverters). Specifically, the gating of the inverters is controlled (e.g., by way of controlling gating signals), through control signals (e.g., PWM signals) that control the duty cycles of the gating signals. Gating can be conducted, for example, at frequencies of 10 kHz (although other variations are possible). The duty cycles are between 0-100%, and the objective is to ensure that the required duty cycles are not over 100% (e.g., the objective of the field weakening approach).

The microcontroller may have embedded software, firmware, instruction sets, such as non-transitory computer readable media storing computer or machine program products which can be executed on a microprocessor to cause the microprocessor to execute steps of a method described in various embodiments herein.

In terms of structural features that can be incorporated for use with electric vehicles, in some embodiments, a microcontroller that is suitably configured is described. In another embodiment, the microcontroller is incorporated into a drivetrain as a controller circuit operating aspects of the drivetrain, such as controlling various duty cycles. In another embodiment, the drivetrain is embedded into an electric vehicle, such as an electric vehicle having a FC and a battery. Not all embodiments are directed to batteries as the other energy source, it is contemplated that alternative energy sources can be used in place of the battery, or in combination with the battery, such as capacitors (e.g., supercapacitors). In alternate various embodiments, the battery energy sources described herein are replaced instead with the alternate energy sources, mutatis mutandis.

The energy source (e.g., battery or capacitor) is bidirectional so that it can provide or receive/absorb power, and is capable of dealing with absorbing or supplying transient power that the FC cannot. The FC can include, for example, PEM fuel cells (proton exchange membrane such as hydrogen fuel cells), among others.

When one accelerates, a large transient requested power from the motor is required. The FC power references observes a low-pass filtered version of the motor requested power, and the approach includes determining the required angle gamma that is needed to ensure that the FC power meets its reference, and then the voltage references needed for the FC inverter and the battery inverter required are computed. The gating signals are then modulated and provided to the two inverters. As described herein, the maximum of the fuel weakening above the maximum of flux producing current (which is generated by the field weakening algorithm or the power sharing algorithm) is selected.

Gamma Control

Figure 24:
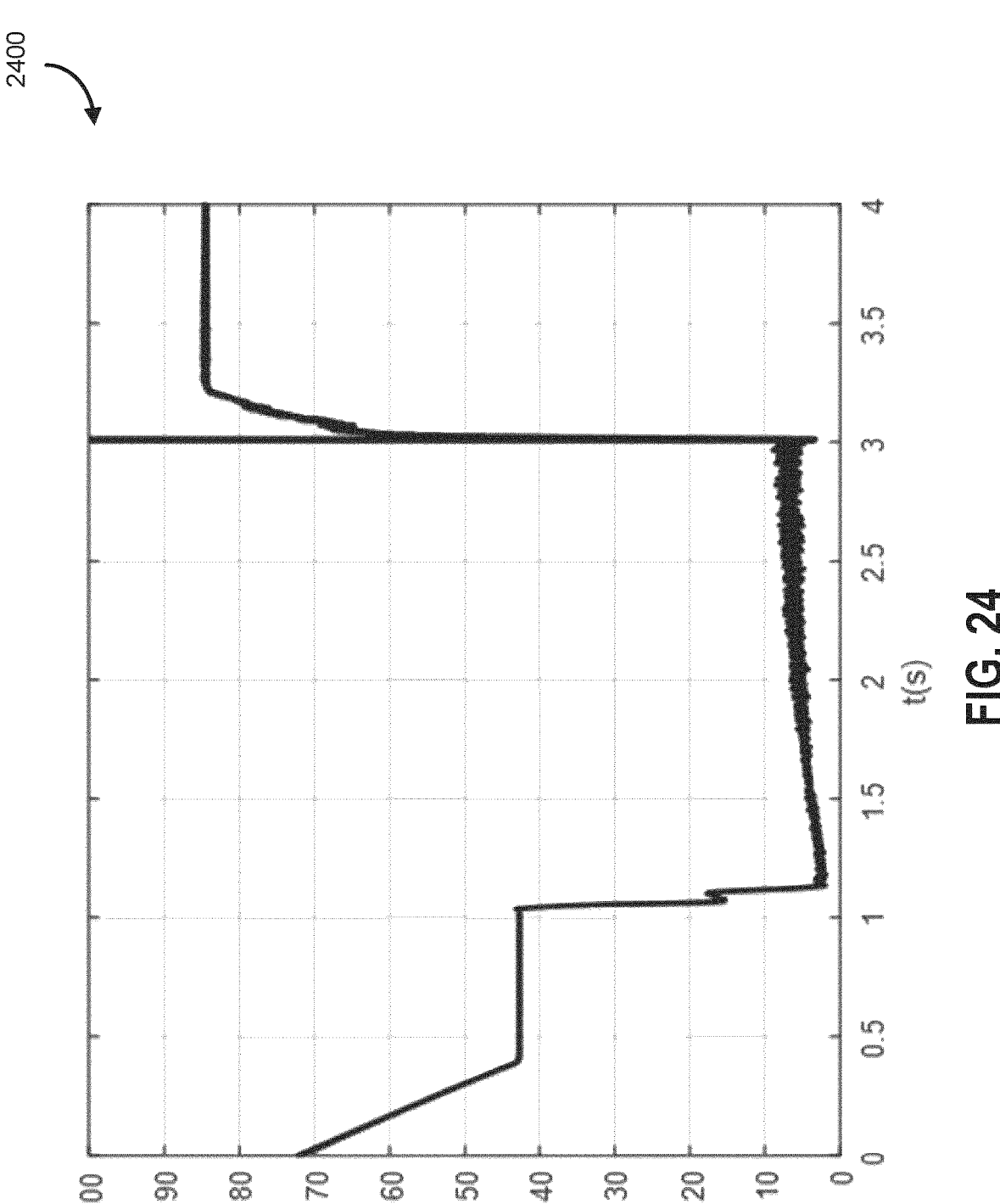
FIG. 24 is a graph of the gamma parameter (angle between fuel cell voltage and motor current vectors) for the simulation whose results are shown from FIG. 12-14.

FIG. 24 is a graph of the gamma parameter (angle between fuel cell voltage and motor current vectors) for the simulation whose results are shown from FIG. 12-14. As shown in FIG. 24 at graph 2400, gamma is shown at the Y axis and is shown against time, in the x-axis.

For t=0 to t=0.4 s, the angle is decreasing as the fuel cell power (shown in FIG. 13B) is increasing.

At t=0.4 s, the fuel cell power reaches its maximum allowable value of 50 kW, so the value of gamma is held constant.

At t=1 s, the acceleration profile of the vehicle (FIG. 12) is reduced towards zero, which causes the motor torque to reduce rapidly. To keep the fuel cell power from also reducing quickly, the value of gamma is reduced rapidly.

This fast reduction in gamma prevents a discontinuity in the fuel cell power at t=1 s when the motor torque rapidly reduces.

Between t=1 s to t=3 s, the value of gamma slowly increases as the fuel cell power begins to ramp down. At t=3 s, a regenerative braking transient is initiated which increases the motor current vector magnitude (as can be seen from the values of $i_d$ and $i_q$ in FIG. 14). The value of gamma is thus increased at this time to allow the fuel cell power to reduce.

At t=3.2 s the fuel cell power reaches its minimum value, which causes the value of gamma to become constant.

Practical Implementation of Modulation Approach

The power sharing approach, in an embodiment, is implemented on a digital signal processor (DSP). This DSP can be physically located on a control printed circuit board (PCB).

The control PCB is electrically connected to sensors which measure the motor currents, battery and fuel cell voltages, and the rotor position of the motor.

These sensor data are interfaced with analog to digital converters on the DSP. Additionally, the control PCB is electrically connected to the gate-drive circuitry of the two inverter modules. One inverter module is connected to the fuel cell on the DC side, while the other is connected to the battery on its DC side.

The control approach, in an example implementation approach is synchronized with the pulse-width-modulation (PWM) frequency of the two inverters. This frequency is typically in the order of 10-20 kHz, which results in a control sampling period of 50 μs to 100 μs. In each sampling period, the approach uses data from the sensors connected to the control PCB and executes the power sharing approach. Based on the fuel cell power and motor torque references, modulation indices are computed for the fuel cell and battery inverters. The DSP then converts these modulation indices to PWM gating signals. These PWM signals are transmitted electrically to the gate driver circuitry of the inverters, and they thus control the switching process of the IGBTs present in each inverter.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the embodiments are intended to include within their scope such processes, machines, manufacture, compositions of matter, means, methods, or steps.

As can be understood, the examples described above and illustrated are intended to be exemplary only.

What is claimed is:

1. A dual inverter drive adapted for direct integration of a fuel cell as a first energy source and a battery pack as a second energy source for power a motor of an electric vehicle, the dual inverter drive comprising:
    a controller circuit configured to establish power factor control to control an angle $\gamma$ imposed between a fuel cell voltage and a stator current vector $I_s$ to ensure that a motor power and a fuel cell power reference are simultaneously met, the power factor control established using the relation:

$$\gamma = \cos^{-1}\left(\frac{4P_{FC}}{3v_{FC}\sqrt{i_d^2 + i_q^2}}\right);$$

wherein $V_{FC}$ is a voltage vector produced by two-level inverters coupled to the fuel cell, and $P_{FC}$ is a power produced by the fuel cell, and $i_d$ and $i_q$ are projections of a stator current vector $I_s$ on a rotating reference frame having axis dq.

2. The dual inverter drive of claim 1, wherein the fuel cell voltage varies with a slow rate of change relative to a voltage of the battery pack, and the voltage of the battery pack exhibits higher rates of change during durations of acceleration or deceleration of the electric vehicle.

3. The dual inverter drive of claim 2, wherein when operating at a high speed during the durations of acceleration or deceleration, the motor operates within a field weakening region of operation, and wherein during durations of cruising of the electric vehicle, the motor operates in a normal region of operation whereby the d-axis current gradually reduces.

4. The dual inverter drive of claim 3, wherein operation in the field weakening region of operation is utilized to prevent a battery converter from saturation.

5. The dual inverter drive of claim 4, wherein a maximum magnitude of a flux-producing current calculated by a power sharing control approach $i\psi_{PS}$ and a flux-producing current magnitude reference $i\psi_{FW}$ is taken as an overall flux producing current reference to ensure that both power sharing and field weakening requirements of the dual inverter drive are met.

6. The dual inverter drive of claim 1, wherein a flux producing current $i_\psi$ is injected during durations of time where $\gamma$ is imaginary, indicating that a magnitude of the current vector is insufficient to generate a requested fuel cell power.

7. The dual inverter drive of claim 6, wherein a complex conjugate for the flux producing current $i_\psi$, $i*_\psi$ is defined using the relation:

$$i_\psi^* = \sqrt{\left(\frac{4P_{FC}}{3v_{FC}}\right)^2 - |\overrightarrow{I_{sm}}|^2};$$

wherein $|\overrightarrow{I}_{sm}|$ is a stator current vector magnitude for maximum torque per ampere (MTPA) operation.

8. The dual inverter drive of claim 7, wherein the flux producing current $i_\psi$ is injected to ensure that that the requested fuel cell power can be generated.

9. The dual inverter drive of claim 7, wherein the flux producing current $i_\psi$ is injected during a period of regenerative braking operation of the electric vehicle.

10. The dual inverter drive of claim 1, wherein the direct integration of a fuel cell includes integrating the fuel cell free of a DC-DC converter for connecting the first energy source and the second energy source to DC links of the dual inverter drive.

11. A method for direct integration of a fuel cell as a first energy source and a battery pack as a second energy source for power a motor of an electric vehicle, the method comprising:
    controlling an angle $\gamma$ imposed between a fuel cell voltage and a stator current vector $I_s$ to ensure that a motor power and a fuel cell power reference are simultaneously met, the power factor control established using the relation:

$$\gamma = \cos^{-1}\left(\frac{4P_{FC}}{3v_{FC}\sqrt{i_d^2 + i_q^2}}\right);$$

wherein $V_{FC}$ is a voltage vector produced by a two-level inverters coupled to the fuel cell, and $P_{FC}$ is a power produced by the fuel cell, and $i_d$ and $i_q$ are projections of the stator current vector $I_s$ on a rotating reference frame having axis dq.

12. The method of claim 11, wherein the fuel cell voltage varies with a slow rate of change, and a voltage of the battery pack exhibits higher rates of change during durations of acceleration or deceleration of the electric vehicle.

13. The method of claim 12, wherein when operating at a high speed during the durations of acceleration or deceleration, the motor operates within a field weakening region of operation, and wherein during durations of cruising of the electric vehicle, the motor operates in a normal region of operation whereby the d-axis current gradually reduces.

14. The method of claim 13, wherein operation in the field weakening region of operation is utilized to prevent a battery converter from saturation.

15. The method of claim 14, wherein a maximum magnitude of a flux-producing current calculated by a power sharing control approach $i\psi_{PS}$ and a flux-producing current magnitude reference $i\psi_{FW}$ is taken as an overall flux producing current reference to ensure that both power sharing and field weakening requirements of a dual inverter drive are met.

16. The method of claim 11, wherein a flux producing current iw is injected during durations of time where $\gamma$ is imaginary, indicating that a magnitude of the current vector is insufficient to generate a requested fuel cell power.

17. The method of claim 16, wherein a complex conjugate for the flux producing current $i_\psi$, $i^*_\psi$ is defined using the relation:

$$i^*_\psi = \sqrt{\left(\frac{4P_{FC}}{3v_{FC}}\right)^2 - |\vec{I_{sm}}|^2}\;;$$

wherein $|\vec{I}_{sm}|$ is a stator current vector magnitude for MTPA operation.

18. The method of claim 17, wherein the flux producing current $i_\psi$ is injected to ensure that that the requested fuel cell power can be generated.

19. The method of claim 17, wherein the flux producing current $i_\psi$ is injected during a period of regenerative braking operation of the electric vehicle.

20. A non-transitory machine readable medium storing machine-interpretable instruction sets, which when executed by a processor, causes the processor to perform steps of a method for direct integration of a fuel cell as a first energy source and a battery pack as a second energy source for power a motor of an electric vehicle, the method comprising:

controlling an angle $\gamma$ imposed between a fuel cell voltage and a stator current vector $I_s$ to ensure that a motor power and a fuel cell power reference are simultaneously met, the power factor control established using the relation:

$$\gamma = \cos^{-1}\left(\frac{4P_{FC}}{3v_{FC}\sqrt{i_d^2 + i_q^2}}\right);$$

wherein $V_{FC}$ is a voltage vector produced by a two-level inverters coupled to the fuel cell, and $P_{FC}$ is a power produced by the fuel cell, and $i_d$ and $i_q$ are projections of the stator current vector $I_s$ on a rotating reference frame having axis.

\* \* \* \* \*